US007218789B2

(12) United States Patent
Faber et al.

(10) Patent No.: US 7,218,789 B2
(45) Date of Patent: May 15, 2007

(54) METHOD FOR LOSSLESS ENCODING OF IMAGE DATA BY APPROXIMATING LINEAR TRANSFORMS AND PRESERVING SELECTED PROPERTIES FOR IMAGE PROCESSING

(75) Inventors: Vance Faber, Carnation, WA (US); Randall L. Dougherty, Seattle, WA (US)

(73) Assignee: LizardTech, Inc., Seattle, WA (US)

( * ) Notice: Subject to any disclaimer, the term of this patent is extended or adjusted under 35 U.S.C. 154(b) by 456 days.

(21) Appl. No.: 10/006,999

(22) Filed: Dec. 3, 2001

(65) Prior Publication Data

US 2002/0124035 A1    Sep. 5, 2002

Related U.S. Application Data

(60) Provisional application No. 60/250,829, filed on Dec. 1, 2000, provisional application No. 60/250,850, filed on Dec. 1, 2000.

(51) Int. Cl.
  *G06K 9/36* (2006.01)
  *G06K 9/46* (2006.01)
  *G09G 5/00* (2006.01)
  *G06F 17/14* (2006.01)

(52) U.S. Cl. .................. 382/244; 382/248; 382/250; 382/276; 345/644; 708/400

(58) Field of Classification Search .......... 382/166, 382/167, 244, 248, 250, 276, 162; 345/644; 358/518–520; 704/203, 269; 708/400–410
See application file for complete search history.

(56) References Cited

U.S. PATENT DOCUMENTS 5,054,103 A * 10/1991 Yasuda et al. .............. 382/250

(Continued)

OTHER PUBLICATIONS

Calderbank et al. ("Wavelet Transforms that Map Integers to Integers," Applied and Computation Harmonic Analysis, vol. 5, No. 3, 1998, pp. 332-369).*

(Continued)

*Primary Examiner*—Jingge Wu
*Assistant Examiner*—Yubin Hung
(74) *Attorney, Agent, or Firm*—Christensen O'Connor Johnson Kindness PLLC

(57) ABSTRACT

A method for generating a first plurality of output data values and the matrix factors used to generate an approximation to an image processing transform is disclosed. The first plurality of output data values are generated by transforming a plurality of input data values using a computer and applying a modified transform stored in a modified transformation matrix to the plurality of input data values. The plurality of input data values are stored in a generated matrix, and at least one data value in this matrix is rearranged using a permutation operation and modified by applying a linear combination of the unmodified values to the at least one data value. The modified transform is an approximation to a known transform stored in a transformation matrix that is used to generate a second plurality of output data values, the first plurality of output values approximating the second plurality of output data values. The modified transformation matrix is generated from a plurality of matrix factors that are generated by factoring the transformation matrix. The known transform and the modified transform approximating the known transform map the same integer data in the plurality of input data values to the same plurality of integer output data values.

18 Claims, 4 Drawing Sheets

U.S. PATENT DOCUMENTS

| | | | | | |
|---|---|---|---|---|---|
| 5,523,847 | A | * | 6/1996 | Feig et al. | 358/426.14 |
| 5,703,799 | A | * | 12/1997 | Ohta | 708/402 |
| 5,790,110 | A | * | 8/1998 | Baker et al. | 345/547 |
| 6,278,753 | B1 | * | 8/2001 | Suarez et al. | 375/350 |
| 7,082,450 | B2 | * | 7/2006 | Hallapuro et al. | 708/402 |

OTHER PUBLICATIONS

Daubechies et al. ("Factoring Wavelet Transforms into Lifting Steps," J. Fourier Analysis Applications, vol. 4, No. 3, 1998, pp. 247-269)—from IDS.*

Gormish et al. ("Lossless and nearly lossless compression for high quality images," Proc. SPIE, vol. 3025, Mar. 1995, pp. 62-70).*

Li et al. ("On implementing Transforms from integers to integers," Proc. ICIP, vol. III, Oct. 4-7, 1998, pp. 881-885).*

(Previously provided) Gormish et al. ("Lossless and nearly lossless compression for high quality images," Proc. SPIE, vol. 3025, Mar. 1997, pp. 62-70).*

(Previously provided) Daubechies et al. ("Factoring Wavelet Transforms into Lifting Steps," J. Fourier Analysis Applications, vol. 4, No. 3, 1998, pp. 247-269).*

Daubechies, I. and W. Sweldens, "Factoring Wavelet Transforms Into Lifting Steps," *J. Fourier Anal. Appl.* 4:247-269, 1998.

Gohberg, I., et al., *Matrix Polynomials*, Academic Press, New York, 1982, Chapter S-1, "The Smith Form and Related Problems," pp. 313-341.

Park, H., "A Realization Algorithm for $SL_2(R[x_1, \ldots, x_m])$ Over the Euclidean Domain," *SIAM J. Matrix Anal. Appl.* 21:178-184, 1999.

Park, H. and C. Woodburn, "An Algorithmic Proof of Suslin's Stability Theorem for Polynomial Rings," *J. Algebra* 178:277-298, 1995.

Sweldens, W., "The Lifting Scheme: A Custom-Design Construction of Biorthogonal Wavelets," *Appl. Com-put. Harmon. Anal.* 3:186-200, 1996.

Sweldens, W., "The Lifting Scheme: A Construction of Second-Generation Wavelets," *SIAM J. Math. Anal.* 29:511-546, 1998.

Tolhuizen, L., et al, "On the Realizability of Bi-Orthogonal, M-Dimensional Two-Band Filter Banks," *IEEE Trans. Signal Processing* 43:640-648, 1995.

Villasenor, J., et al., "Wavelet Filter Evaluation for Image Compression," *IEEE Trans. Image Processing* 4:1053-1060, 1995.

Recommendation ITU-R BT.601-5, "Studio Encoding Parameters of Digital Television for Standard 4:3 and Wide-Screen 16:9 Aspect Ratios," International Telecommunication Union, Oct. 1995, pp. 1-16.

* cited by examiner

METHOD FOR LOSSLESS ENCODING OF IMAGE DATA BY APPROXIMATING LINEAR TRANSFORMS AND PRESERVING SELECTED PROPERTIES FOR IMAGE PROCESSING

CROSS-REFERENCES TO RELATED APPLICATIONS

This application claims the benefit of provisional U.S. Application Ser. No. 60/250,829, filed Dec. 1, 2000; and provisional U.S. Application Ser. No. 60/250,850, filed Dec. 1, 2000, under 35 U.S.C. § 119.

FIELD OF THE INVENTION

This invention relates to image processing and, more particularly, to a method for approximating image processing transforms with invertible integer-to-integer transforms.

BACKGROUND OF THE INVENTION

Contemporary image processing methods apply image data transforms in a vast array of applications. In many cases, the transformation process causes a loss of data and frequently requires complex image data compression and decompression circuitry for image transmission and restoration. Lossless image transformation processes are generally perceived as being computationally expensive and tend not to be used as often as lossy transformation processes. Among the most widely used image data transforms are the wavelet transform and the color transform.

The processing of image data also requires sophisticated methods for manipulating data stored in multi-dimensional matrices. At times, such data can be highly position dependent and any processing on such data may require certain types of highly localized processing given the unique nature of the interactions between image data at neighboring locations. These matrices may also be comprised of different types of numerical values. Frequently, such matrices include real number entries that are applied to an input data set that may also be comprised of real numbers or other types of numerical data. In the event integer input data is provided, the output image data produced by a transformation matrix comprised of real numbers may not necessarily provide the most accurate mapping of input data values to output data values. Furthermore, the reliable mapping of entire classes of numerical data may require the processing of bounded and unbounded length input data vectors.

A reliable image data transformation process is needed that can be used to map integer input data to integer output data without the possible loss of data associated with the transformation of such input data by transformation matrices including real number entries. This process must be capable of being applied to the most widely used transforms for input data vectors that are bounded and unbounded in length. The present invention is directed to providing computer-implemented methods for generating integer-to-integer transformation matrices that are approximations to known linear transformation matrices.

SUMMARY OF THE INVENTION

In accordance with the present invention, a method for lossless encoding of image data involving the approximation of an invertible linear transformation by an integer-to-integer transformation is disclosed. The invertible linear transformation may be applied to vectors of a fixed length or to vectors of unbounded length which are of bounded amplitude. An approximation to an invertible linear transformation is at times necessary when the input vectors are integers and the entries in a matrix including the transformation are real numbers. The invention discloses methods for factoring a matrix including an invertible linear transformation into simpler matrices of a form which allows them to be approximated directly.

Among the types of matrices that may be generated by the approximation methods are elementary matrices, permutation matrices and diagonal matrices, each of which are simpler to process in an image processing system. It is an object of the present invention to enable the factored matrices to have certain useful properties. Among the various useful properties preserved by the computer-implemented matrix factorization methods are their ability to maintain correct values at certain inputs that a given linear transformation already maps to integers. The methods can also be used to preserve local interactions between coordinates in an input subspace that directly influence neighboring data in an output subspace. The methods disclosed in this invention can be applied to well-known transforms such as the RGB→$YC_BC_R$ color transform and the 9-7 wavelet transform.

In accordance with an aspect of the present invention, a method is described for generating a first plurality of output data vales by transforming a plurality of input data values using a computer. The first plurality of output data values approximate a second plurality of output data values. The second plurality of output data values are generated by applying a linear transform to the first plurality of input data values. The linear transform may be a finite one-dimensional linear transform or a 9-7 wavelet transform. This method comprises at least one step, the step being a rearrangement of at least one data value in a plurality of current input data values, a negation of at least one value in the plurality of current input data values, a modification at least one data value in the plurality of current input data values, or a successive combination of one or more of these steps.

In accordance with another aspect of the invention, a method for factoring a linear transformation matrix storing a finite one-dimensional linear transform is disclosed. The method requires the LU-decomposition of the linear transformation matrix, the generation of four matrices from the LU-decomposed matrix, the generation of a third matrix and a signed permutation matrix, the generation of a permuted linear transformation matrix, the computation of an upper triangular matrix from the permuted linear transformation matrix, the factoring of the permuted linear transformation matrix, and the generation of matrix factors from the linear transformation matrix.

In yet another aspect of the present invention, a computer-implemented method is disclosed for generating a sequence of matrix factors for use in generating a matrix that approximates the transformation matrix that stores a wavelet transform. This method involves the application of at least one row reduction operation to the transformation matrix and the generation of a sequence of matrix factors from the transformation matrix after application of the at least one row reduction operation.

As will be readily appreciated from the foregoing description, the invention provides several new methods for the lossless encoding of image data by use of an approximation matrix that can map integer input data to integer output data that is the same as that mapped to by a transformation matrix storing a known linear transform.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
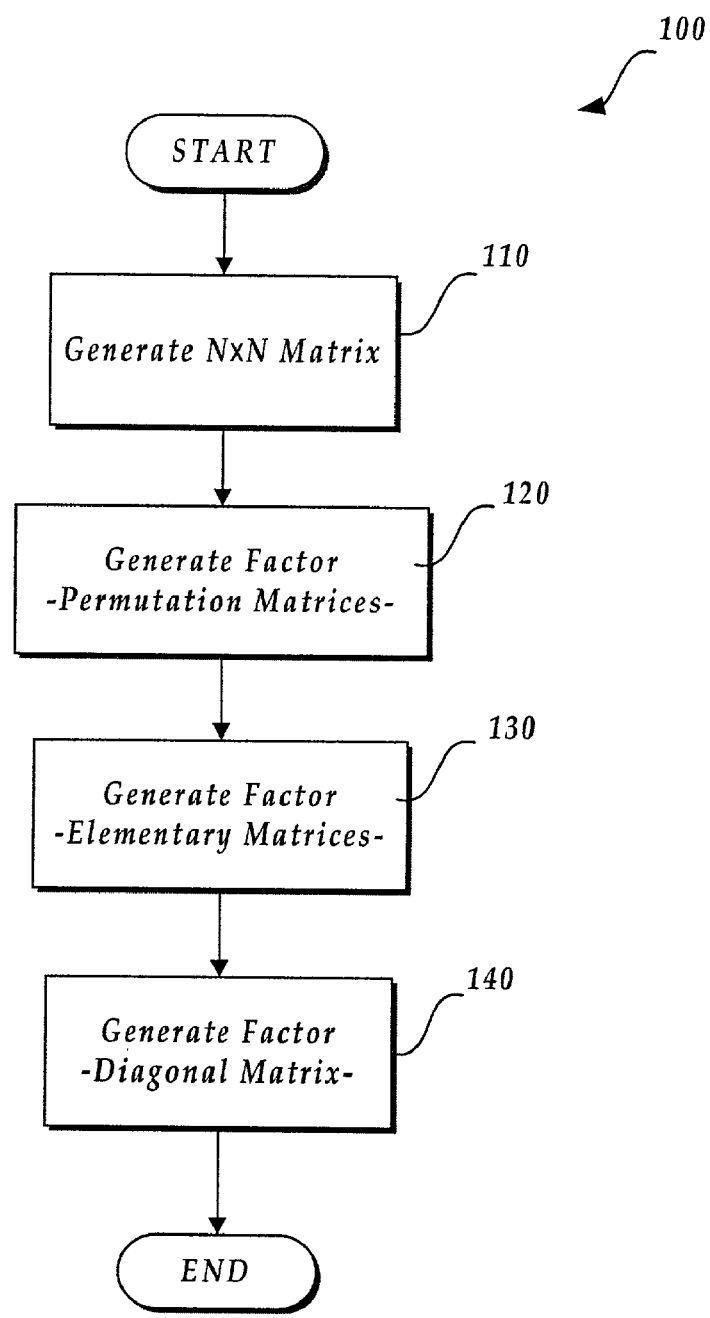
FIG. 1 is a flowchart illustrating a process for generating matrix factors in accordance with the present invention.

While the preferred embodiment of the invention has been illustrated and described, it will be appreciated that various changes can be made therein without departing from the spirit and scope of the invention.

Introduction

In various signal processing applications, one must apply an invertible linear transformation. The input vectors are often given as integers, while the transformation has real entries. In some situations, it is convenient to approximate the linear transformation by another (possibly nonlinear) invertible transformation which maps integer vectors to integer vectors.

There are actually two versions of this problem. The first version exists when the given vectors have a fixed (probably small) length n. Given a linear map from $R^n$ onto $R^n$ specified by an n×n matrix A, and a (probably nonlinear) bijection $\phi$ is needed from $Z^n$ to $Z^n$ which is close to A in the sense that $\|Ax-\phi x\|$ is bounded for $x \in Z^n$. (We will use the Euclidean norm, but one could use other norms as well. Note also the use of the words "length" for the number of coordinates in a vector, and "norm" for the Euclidean magnitude of the vector.) Equivalently, we have the standard integer lattice $Z^n$ and a linearly transformed lattice $AZ^n$, and we want to find a bijection $\psi$ from the transformed lattice to the original lattice which moves points as small a distance as possible (so $\psi = \phi \cdot A^{-1}$). Please note that we are using the same symbol A for the linear transformation and for its associated matrix.

In the second version of the problem, the input vectors are signals which can have unbounded length, but are of bounded amplitude (i.e., the values appearing as coordinates of the vector are bounded). Both versions of the problem were described in co-pending and co-filed prior provisional U.S. Application Ser. Nos. 60/250,829 and 60/250,850, each of which are hereby incorporated by reference. Several methods providing practical solutions to these problems will be discussed in this document. The image processing methods described herein can be performed in various software systems.

For both versions of the problem, the goal is to find an integer bijection $\phi$ approximating the given transformation so that the approximation error is bounded over all inputs, preferably with a small bound. (Of course, there are other properties one would like $\phi$ to have, such as easy computability of $\phi$ and $\phi^{-1}$.) As we will see, this is possible only if the determinant is ±1 in the fixed-length case; there is a similar restriction in the unbounded-length case. Even then it is not obvious that one can get the error to be bounded. In the fixed-length case, one could try some sort of greedy algorithm which initially maps each point in the first lattice to the nearest point in the second lattice and then goes through a correction process to resolve collisions (two points mapped to the same point) and gaps (points in the second lattice not images of any point in the first lattice), but the corrections might get worse and worse as more points are processed, and it is not at all clear that one can get a bounded-error bijection this way.

Invertible Integer-to-Integer Mappings

We start by showing that, in the fixed-length case, a necessary condition for the existence of a bounded-error integer approximation $\phi$ to the linear transformation A is that det A=±1. Suppose that such a $\phi$ exists with error bound $\delta$, and let $\psi = \phi \cdot A^{-1}$. Then for a large positive integer M, the points in the transformed lattice $AZ^n$ within the cube $[-M, M]^n$ are mapped by $\psi$ to standard lattice points in the slightly larger cube $[-M-\delta, M+\delta]^n$, and all standard lattice points in the smaller cube $[-M+\delta, M+\delta]^n$ are reached in this way. So the number of transformed lattice points in the cube $[-M, M]^n$ must be $(2M+1)^n + O(M^{n-1})$ for large M; this implies that the determinant of the transformed lattice (i.e., det A) is ±1.

We may as well assume that the determinant is 1, because, if it is −1, we can negate a row of the matrix to change the determinant to +1. An integer approximation for the modified matrix easily yields an integer approximation for the original matrix (just negate the specified coordinate at the end).

The main approach we will use for integer approximations is to divide and conquer: if we have a linear transformation with no obvious suitable integer approximation, then we factor the matrix into parts which we do know how to approximate. The composition of these approximations of parts will be a suitable approximation to the entire transformation. To see this, first consider the two-factor case: if $A = A_1 A_2$ and we have $\phi_1$ and $\phi_2$ approximating $A_1$ and $A_2$ so that $\|A_1 x - \phi_1 x\| \leq C_1$ and $\|A_2 x - \phi_2 x\| \leq C_2$ for all x, then $\phi_1 \cdot \phi_2$ approximates A, because $$\|A_1 A_2 x - \varphi_1 \varphi_2 x\| \leq \|A_1 A_2 x - A_1 \varphi_2 x\| + \|A_1 \varphi_2 x - \varphi_1 \varphi_2 x\|$$

$$\leq \|A_1\| \|A_2 x - \varphi_2 x\| + \|A_1 \varphi_2 x - \varphi_1 \varphi_2 x\|$$

$$\leq \|A_1\| C_2 + C_1.$$

We can iterate this: if $A = A_1 A_2 \ldots A_k$ where each $A_i$ can be approximated by an integer mapping with error bound $C_i$, then A can be approximated by the composition of these integer mappings with error bound $$C_1 + \|A_1\| C_2 + \|A_1\| \|A_2\| C_3 + \ldots + \|A_1\| \|A_2\| \ldots \|A_{k-1}\| C_k. \tag{1.1}$$

If one does the whole computation here at once, rather than iteratively, one gets a slightly improved form of the bound:

$$C_1 + \|A_1\|C_2 + \|A_1A_2\|C_3 + \ldots + \|A_1A_2 \ldots A_{k-1}\|C_k. \quad (1.2)$$

Since the goal here is to produce invertible integer approximations to invertible linear transformations, we will also be interested in error estimates for the inverse transform: we will want a bound on $\|A^{-1}y - \phi^{-1}y\|$ over all integer vectors y. This bound will not in general be the same as the bound for the forward transform, but it is closely related: for any such y, if we let $x = \phi^{-1}y$, then $$\begin{aligned} \|A^{-1}y - \varphi^{-1}y\| &= \|A^{-1}\varphi x - x\| \quad (1.3) \\ &= \|A^{-1}\varphi x - A^{-1}Ax\| \\ &= \|A^{-1}(\varphi x - Ax)\| \\ &\leq \|A^{-1}\| \|Ax - \varphi x\| \end{aligned}$$

A similar computation gives $\|Ax - \phi x\| \leq \|A\| \|A^{-1}y - \phi^{-1}y\|$, so $\|A^{-1}y - \phi^{-1}y\| \geq \|A\|^{-1} \|Ax - \phi x\|$.

Formulas such as (1.2) indicate that, if multiple factorizations of a given transformation are available, then the ones with fewer factors are likely to have better error bounds (assuming that the error bounds and norms for the factors in the factorizations are similar).

A special factor that will occur frequently in factorizations and is easy to handle is a permutation matrix which merely rearranges coordinates or bands. In fact, we can generalize this by allowing some of the 1's in the permutation matrix to be changed to −1's (negating some coordinates or bands). This will be needed because permutation matrices can have determinant −1 and we usually want to restrict to matrices of determinant 1. We will often refer to such signed permutation matrices as 'permutation' matrices.

Such a matrix is normally a "free" factor: it is approximable by an integer mapping with error 0, and its norm is 1, so it does not inflate the errors from the other factors in formula (1.1). In fact, since this matrix gives an isometry both of $R^n$ and of $Z^n$, it cannot have any effect on the error bounds from a factorization if it occurs first or last in that factorization. If it occurs in the middle, then it might have a slight effect on the error by affecting the relation between the two factors it lies between.

Another type of factor which will be fundamental in the following is an elementary matrix, which differs from the identity matrix only at a single off diagonal entry. Applying such a matrix has the effect of adding a multiple of one coordinate to another coordinate.

If A is a 2×2 elementary matrix, say $$A = \begin{pmatrix} 1 & a_{12} \\ 0 & 1 \end{pmatrix}, \text{ so that } A\begin{pmatrix} x_1 \\ x_2 \end{pmatrix} = \begin{pmatrix} x_1 + a_{12}x_2 \\ x_2 \end{pmatrix}, \text{ then let}$$

$$\varphi\begin{pmatrix} x_1 \\ x_2 \end{pmatrix} = \begin{pmatrix} \langle x_1 + a_{12}x_2 \rangle \\ x_2 \end{pmatrix} = \begin{pmatrix} x_1 + \langle a_{12}x_2 \rangle \\ x_2 \end{pmatrix},$$

where <y> is y rounded to an integer in a consistent way (say, round to nearest with half-integers rounded upward) so that, for any integer n and real number y, y, <n+y>=n+<y>. (Consistency is needed only if we want to think of the mapping $\phi$ as "apply A and then round all coordinates to integers." If we are willing to forget about $<x_1 + a_{12}x_2>$ and go straight to $x_1 + <a_{12}x_2>$, then any rounding function can be used.) Then we have $\|Ax - \phi x\| \leq \frac{1}{2}$. And $\phi$ is invertible: if $$\varphi\begin{pmatrix} x_1 \\ x_2 \end{pmatrix} = \begin{pmatrix} y_1 \\ y_2 \end{pmatrix},$$

then $x_2 = y_2$ and $x_1 = y_1 - <a_{12}x_2>$. (Note that $y_1 - <a_{12}x_2>$ might occasionally be different from $y_1 + <-a_{12}x_2>$. In other words, the inverse of the integer approximation of A need not be the same as the integer approximation of the inverse of A, because the rounding is done slightly differently. However, for elementary matrices the differences should be rare, occurring only when the number to be rounded is equal to or very near a half-integer.)

We will see in the section entitled "Larger Matrices" that unit triangular matrices (i.e., lower or upper triangular matrices whose diagonal entries are all 1) are as suitable as elementary matrices for the purpose of obtaining integer approximations.

One can think of the usual full Gaussian elimination process as factoring a matrix into elementary matrices, simple permutation matrices (for pivoting), and a diagonal matrix. For most applications of such factorizations, the elementary matrices are the ones requiring attention, while the permutations and diagonal matrices are trivial and can be ignored. The present situation is an exception; elementary matrices (and permutation matrices) are easy to handle directly, but diagonal matrices are not. We will investigate the 2×2 diagonal matrices extensively in the next section.

The linear transformations and the corresponding integer approximations may change the range that the coordinates vary over—an approximation which maps integers to integers need not map 16-bit integers to 16-bit integers. It is easy to determine the new ranges after the linear transformation: if the transformation is given by $A = (a_{ij})_{n,n}$ and input coordinate number j is bounded in absolute value by $b_j$ for each j, then output coordinate number i is bounded in absolute value by $$\sum_{j=1}^{n} |a_{ij}| b_j.$$

(Similar bounds can be computed if the input coordinates are restricted to intervals not symmetric around 0.)

Since the integer approximation is supposed to be within a fixed distance of the linear transformation, one can easily adjust these bounds to get bounds for the approximation. (However, intermediate results may not lie within these bounds; one may need to compute ranges for the individual factor matrices in order to bound these.)

The 2×2 Diagonal Matrix

As mentioned in the previous section, diagonal matrices, which are trivial for most applications, are quite nontrivial when it comes to integer approximations; here we will factor them into matrices which can be approximated directly. We may assume that the given diagonal matrix has determinant 1. Furthermore, if we have an n×n diagonal matrix of determinant 1, we can factor it into simpler diagonal matrices of determinant 1 each having only two nontrivial diagonal entries: the n=3 case is $$\begin{pmatrix} d_1 & 0 & 0 \\ 0 & d_2 & 0 \\ 0 & 0 & d_3 \end{pmatrix} = \begin{pmatrix} d_1 & 0 & 0 \\ 0 & d_1^{-1} & 0 \\ 0 & 0 & 1 \end{pmatrix} \begin{pmatrix} 1 & 0 & 0 \\ 0 & d_1 d_2 & 0 \\ 0 & 0 & d_3 \end{pmatrix}$$

and larger matrices are handled similarly. So we can concentrate on the determinant-1 2×2 diagonal matrix.

$$D = \begin{pmatrix} \alpha & 0 \\ 0 & \alpha^{-1} \end{pmatrix}.$$

We may assume $\alpha > 0$, since otherwise we can just pull out the scaling factor $$\begin{pmatrix} -1 & 0 \\ 0 & -1 \end{pmatrix},$$

which is "free" (i.e., just negate everything at the end). We can factor D into four elementary matrices:

$$D = \begin{pmatrix} 1 & r \\ 0 & 1 \end{pmatrix} \begin{pmatrix} 1 & 0 \\ s & 1 \end{pmatrix} \begin{pmatrix} 1 & -r\alpha^{-1} \\ 0 & 1 \end{pmatrix} \begin{pmatrix} 1 & 0 \\ -s\alpha & 1 \end{pmatrix} \quad (2.1)$$

where r and s are chosen so that $rs + 1 = \alpha$, or $$D = \begin{pmatrix} 1 & 0 \\ s & 1 \end{pmatrix} \begin{pmatrix} 1 & r \\ 0 & 1 \end{pmatrix} \begin{pmatrix} 1 & 0 \\ -s\alpha & 1 \end{pmatrix} \begin{pmatrix} 1 & -r\alpha^{-1} \\ 0 & 1 \end{pmatrix} \quad (2.2)$$

where $rs + 1 = \alpha^{-1}$. Any such factorization leads to a bounded-error integer approximation for D. A plausible choice for r and s would be to "balance" the factors by requiring $|r| = |s\alpha|$, but it is not clear that this will minimize the error bound. The factorizations appearing in the prior art are (2.1) with $r = \alpha - \alpha^2$ and (2.2) with $s = -1$.

Or we can factor D into three elementary matrices and a 'permutation' matrix:

$$D = \begin{pmatrix} 0 & 1 \\ -1 & 0 \end{pmatrix} \begin{pmatrix} 1 & 0 \\ \alpha & 1 \end{pmatrix} \begin{pmatrix} 1 & -\alpha^{-1} \\ 0 & 1 \end{pmatrix} \begin{pmatrix} 1 & 0 \\ \alpha & 1 \end{pmatrix}, \quad (2.3)$$

$$D = \begin{pmatrix} 0 & -1 \\ 1 & 0 \end{pmatrix} \begin{pmatrix} 1 & \alpha^{-1} \\ 0 & 1 \end{pmatrix} \begin{pmatrix} 1 & 0 \\ -\alpha & 1 \end{pmatrix} \begin{pmatrix} 1 & \alpha^{-1} \\ 0 & 1 \end{pmatrix}. \quad (2.4)$$

One can modify these so as to have the 'permutation' matrix appear at a different place in the factorization; this will not affect the error bounds we obtain here.

The factorizations (2.3) and (2.4) are closely related: one can get (2.4) from (2.3) by interchanging the two coordinates throughout and replacing $\alpha$ with $\alpha^{-1}$. Note that "interchanging the two coordinates" is equivalent to conjugation by the reverse-diagonal matrix $$J = \begin{pmatrix} 0 & 1 \\ 1 & 0 \end{pmatrix}.$$

Similarly, one gets (2.2) from (2.1) by interchanging the two coordinates, replacing $\alpha$ with $\alpha^{-1}$, and interchanging r and s.

Note that these error bounds apply to D in isolation. If the diagonal matrix is just one part of a larger transformation, then when the parts are put together one can often combine factors such as adjacent elementary matrices with the nonzero entry in the same location; this normally will reduce the resulting error.

The factorizations (2.1)–(2.4) of D can easily be inverted to give factorizations of $D^{-1}$ into elementary factors. As noted earlier, the integer approximations for these inverse factorizations are not quite the same as the inverses of the integer approximations for the direct factorizations. However, in the 2×2 case the differences only show up when a result lies exactly halfway between two integers and must be rounded to one of them (assuming rounding to the nearest integer). Since the analysis here will not depend on how such choices are made, we can do error analysis of the inverse factorizations to get error bounds for the inverse transformation.

It turns out that we do not need to do any additional work to get the bounds for the inverse transformation here. The inverse of (2.3) is:

$$D^{-1} = \begin{pmatrix} 1 & 0 \\ \alpha & 1 \end{pmatrix}^{-1} \begin{pmatrix} 1 & -\alpha^{-1} \\ 0 & 1 \end{pmatrix}^{-1} \begin{pmatrix} 1 & 0 \\ \alpha & 1 \end{pmatrix}^{-1} \begin{pmatrix} 0 & 1 \\ -1 & 0 \end{pmatrix}^{-1}$$

$$= \begin{pmatrix} 1 & 0 \\ -\alpha & 1 \end{pmatrix} \begin{pmatrix} 1 & -\alpha^{-1} \\ 0 & 1 \end{pmatrix} \begin{pmatrix} 1 & 0 \\ -\alpha & 1 \end{pmatrix} \begin{pmatrix} 0 & -1 \\ 1 & 0 \end{pmatrix}.$$

Conjugating this by the matrix $$\begin{pmatrix} 1 & 0 \\ 0 & -1 \end{pmatrix}$$

(an isometry which will not affect error bounds and which commutes with the given diagonal matrix) gives the formula $$D^{-1} = \begin{pmatrix} 1 & 0 \\ \alpha & 1 \end{pmatrix} \begin{pmatrix} 1 & -\alpha^{-1} \\ 0 & 1 \end{pmatrix} \begin{pmatrix} 1 & 0 \\ \alpha & 1 \end{pmatrix} \begin{pmatrix} 0 & 1 \\ -1 & 0 \end{pmatrix}.$$

This is exactly the same as (2.3) except that the 'permutation' occurs at the left (the end) instead of the right (the beginning). It follows that any error bound we obtain for the forward transform for (2.3) will also be a bound for the error in the inverse transform.

The same reasoning shows that any forward transform error bound for (2.4) is also an inverse transform error bound. The inverse of (2.1) turns out to be (2.2) with $\alpha$, r, s replaced with $\alpha^{-1}$, $s\alpha$, $r\alpha^{-1}$ respectively, so we can obtain inverse transform error, bounds for (2.1) from forward transform error bounds for (2.2); similarly, forward transform error bounds for (2.1) give inverse transform error bounds for (2.2).

One can work out that $$\left\|\begin{pmatrix} 1 & r \\ 0 & 1 \end{pmatrix}\right\| = \left\|\begin{pmatrix} 1 & 0 \\ r & 1 \end{pmatrix}\right\| = \frac{|r| + \sqrt{r^2 + 4}}{2}.$$

Using this and the combination formula (1.1), one can compute an error bound for the integer mappings coming from each of the factorizations (2.1)–(2.4). (Each of the 2×2 elementary matrices has an error bound of ½ unless it has integer entries, in which case it has error bound 0.) However, the formulas for these bounds are rather messy; for instance, the error bound for (2.3) is $$\frac{1}{8}(4 + (2 + \alpha^{-1} + \sqrt{4 + \alpha^{-2}})(\alpha + \sqrt{4 + \alpha^{-2}})).$$

As a useful example, let us consider the special case $\alpha = \sqrt{2}$. In this case the error bounds for (2.3) and (2.4) become respectively $$\frac{1}{4}(2 + (\sqrt{3} + 1)(\sqrt{2} + 2)) \approx 2.8319512300735069,$$

$$\frac{1}{2}(2 + \sqrt{2} + \sqrt{3}) \approx 2.5731321849709862$$

For (2.1) and (2.2) with $\alpha = \sqrt{2}$, the error bound C is still a messy function, this time of the parameter r (from which s is computable: $s=(\alpha-1)/r$ or $s=(\alpha^{-1}-1)/r$. Note that we may assume r>0, since negating r and s yields another valid factorization without changing the norms of the factors. As previously mentioned, a plausible choice of r is $r = \sqrt{2-\sqrt{2}} \approx 0.7653668647301795$ for (2.1) and $r = \sqrt{\sqrt{2}-1} \approx 0.6435942529055826$ for (3.2); these yield error bounds of about 3.4167456510765178 and 3.1662988562277977, respectively. Numerical optimization on r yields the following values:

for (2.1): r≈0.4811840837330633, C≈3.2403445213547604;

for (2.2): r≈0.8035642481527317, C≈3.1303571980433588.

Using more detailed calculations, we can get error estimates more precise than those obtained from norms of matrices. Look at a particular elementary factor matrix $A_i$. If the nonzero off diagonal entry of $A_i$ is in the upper right, and if $\phi_i x$ is the result of rounding $A_i x$ to integer coordinates, then for any integer vector $x_i$ the error vector $\phi_i x_i - A_i x_i$ will have the form $(e_i, 0)$, where $|e_i| \leq \frac{1}{2}$. Combining this for all factors in a product $A = A_1 A_2 \ldots A_k$, we get $$d = \phi_1 \phi_2 \ldots \phi_k x - Ax = d_1 + A_1 d_2 + A_1 A_2 d_3 + \ldots + A_1 A_2 \ldots A_{k-1} d_k,$$

where $$d_i = \phi_i \phi_{i+1} \ldots \phi_k x - A_i \phi_{i+1} \ldots \phi_k x$$

is of the form $(e_i, 0)$ if $A_i$ is elementary with upper right entry nonzero, $d_i = (0, e_i)$ if $A_i$ is elementary with lower left entry nonzero, and $d_i$ is the zero vector (i.e., term number i in the error bound is omitted) if $A_i$ is an integer matrix. We can now find the maximum possible value of $\|d\|$ subject to the constraint that $|e_i| \leq \frac{1}{2}$ for all i, and this will give an error bound for the integer approximation of A.

For the factorization (2.3), we get $$d = \begin{pmatrix} e_2 + e_3 \alpha \\ -e_3 + e_4 \alpha^{-1} \end{pmatrix}.$$

Clearly we maximize $\|d\|$ by letting $e_2$, $e_3$, $e_4$ all have absolute value ½, with $e_2$ and $e_3$ having the same sign and $e_4$ having the opposite sign. This gives the error bound $$\|d\| \leq \frac{1}{2}(1 + \alpha^{-1})\sqrt{1 + \alpha^2}.$$

Because of the known relation between (2.3) and (2.4), we get the error bound for (2.4) by replacing $\alpha$ with $\alpha^{-1}$ in the error bound for (2.3):

$$\|d\| \leq \frac{1}{2}(1 + \alpha)\sqrt{1 + \alpha^{-2}}.$$

These two bounds are actually equal. In the case $\alpha = \sqrt{2}$, the common value of the bound is $$\frac{1}{4}\sqrt{3}(2 + \sqrt{2}) \approx 1.4783978394802332..$$

For (2.1) we have $$d = \begin{pmatrix} e_1 + e_2 r + e_3 \alpha \\ e_2 + e_3 s + e_4 \alpha^{-1} \end{pmatrix}.$$

This leads to case distinctions based on the signs of $\alpha-1$, r, and s. As before, we may assume that r>0; this means that $\alpha-1$ and s have the same sign, since $rs = \alpha-1$.

If $\alpha > 1$, and hence s>0, then clearly $\|d\|$ is maximized when the errors $e_i$ are all ½ or all $-½$. So the error bound is:

$$\|d\| \leq \frac{\sqrt{(r\alpha(r + \alpha + 1))^2 + (r(\alpha + 1) + \alpha(\alpha - 1))^2}}{2r\alpha}.$$

One can actually work out the critical points of this function of r (holding $\alpha$ fixed) by solving a fourth-degree polynomial equation, but it is probably more convenient to find the optimal value of r numerically.

If $\alpha < 1$ (so s<0), then the choice of signs for the errors $e_i$ is much less clear; aligning them to make one component of d maximal will cause cancellation in the other component. One must consider the various possibilities to see which yields the longest error vector for given values of $\alpha$ and r. (It is easy to see that $e_i$ should be ±½, because the most distant point from the origin on a line segment is always one of the two endpoints; only the signs of the numbers $e_i$ are unknown.)

The situation for (2.2) is reversed: for $\alpha < 1$ one can get a single formula for the maximal error, but for $\alpha > 1$ one must look at various cases.

Again consider the example $\alpha = \sqrt{2}$. For (2.1) we have a single error formula and can proceed directly to numerical optimization to find that the best value for r is about 0.5789965414556075, giving an error bound of about 1.9253467944884184. For (2.2), the error bound is the maximum of four separate formulas; it turns out that this is minimized where two of the formulas cross each other, at r= $\sqrt{2\sqrt{2}-2}/2 \approx 0.4550898605622273$, and the error bound is $\sqrt{12+18\sqrt{2}}/4 \approx 1.5300294956861884$.

We still have to consider special values of r and s where one of the four matrices in (2.1) or (2.2) is integral, and hence the corresponding $e_i$ becomes 0. Among these are several cases giving an error bound matching the value $$\frac{1}{4}\sqrt{3}(2+\sqrt{2})$$

from (2.3), and two cases which give even better bounds: putting r=$\sqrt{2}$ in (2.2) gives an error bound of $\sqrt{21+8\sqrt{2}}/4 \approx 1.4211286997265756$, and putting r=$1-1/\sqrt{2}$ in (2.2) gives an error bound of $\sqrt{6+2\sqrt{2}}/2 \approx 1.3614526765897057$.

Even this does not exhaust the error analysis for (2.1)–(2.4). The error bounds obtained above are not sharp, because the errors $e_i$ are not actually independent of each other. For instance, in the computation for (2.3), $e_2$ is not independent of $e_3$ and $e_4$: one can show that $e_2+\alpha e_3-e_4$ must be an integer. (If we start with an integer vector x=(x1, x2), then the second component of $\phi_4 x$ is $b=x_2+x_1\alpha+e_4$ and the second component of $\phi_2\phi_3\phi_4 x$ is $b'=x_1\alpha+e_3\alpha+e_2$; these are both integers, so $b'-b+x_2=e_2\alpha e_3-e_4$ is an integer.) Using this, we can get the following error bound:

$$\|d\| \leq \begin{cases} \frac{1}{2}\sqrt{(\alpha+1)^2 + \alpha^{-2}(2\lceil\alpha/2\rceil-1)^2} & \text{if } \alpha > 1, \\ \frac{1}{2}\sqrt{(\alpha^{-1}+1)^2 + (2\lceil\alpha/2\rceil-1)^2} & \text{if } \alpha > 1. \end{cases}$$

Replace $\alpha$ with $\alpha^{-1}$ to get the corresponding error bound for (2.4). For $\alpha=\sqrt{2}$ the error bounds for (2.3) and (2.4) are $\sqrt{14+8\sqrt{2}}/4 \approx 1.2578182623839374$ and $\sqrt{4+2\sqrt{2}}/2 \approx 1.3065629648763765$, respectively.

Such improvements for (2.1) and (2.2) are available only for special values of r and s, and depend highly on the specific form of these numbers and of $\alpha$. For instance, in (2.2) for $\alpha=\sqrt{2}$ and r=$1-1/\sqrt{2}$, this method gives an error bound of $\sqrt{4+2\sqrt{2}}/2$, the same as for (3.4) above.

These final error bounds for (2.3) and (2.4) are provably sharp when $\alpha$ is irrational, as is the above bound for the instance r=$1-1/\sqrt{2}$ of (2.2). So (2.3) appears to give the best results among these methods when $\alpha=\sqrt{2}$.

If $\alpha$ is rational (and, in the case of (2.1) and (2.2), the parameters r and s are also rational), then the errors from the integer approximation are periodic in both coordinates, so one can perform a finite computation to get the exact error bound for a particular factorization.

One can obtain other integer approximation methods for rational $\alpha$ by constructing a finite configuration on a rectangle in the plane and extending 'periodically' to get the full mapping. Even for irrational $\alpha$, where a 'periodic' solution is not available, one can still use integer approximation methods completely different from those obtained via factorization into elementary matrices.

Larger Matrices

As noted before, one can use Gaussian elimination to factor an n×n matrix of determinant 1 into elementary matrices, permutation matrices (or 'permutation' matrices of determinant 1), and a diagonal matrix of determinant ±1; we may assume that the determinant of the diagonal matrix is 1, because we can transfer a negation to one of the 'permutation' factors. A diagonal matrix of determinant 1 can be factored into simpler diagonal matrices which have only two entries different from 1, these entries being reciprocals of each other; these simpler matrices can then be factored as in (2.1)–(2.4). So we know that any matrix of determinant 1 can be factored into integer-approximable factors.

Figure 2:
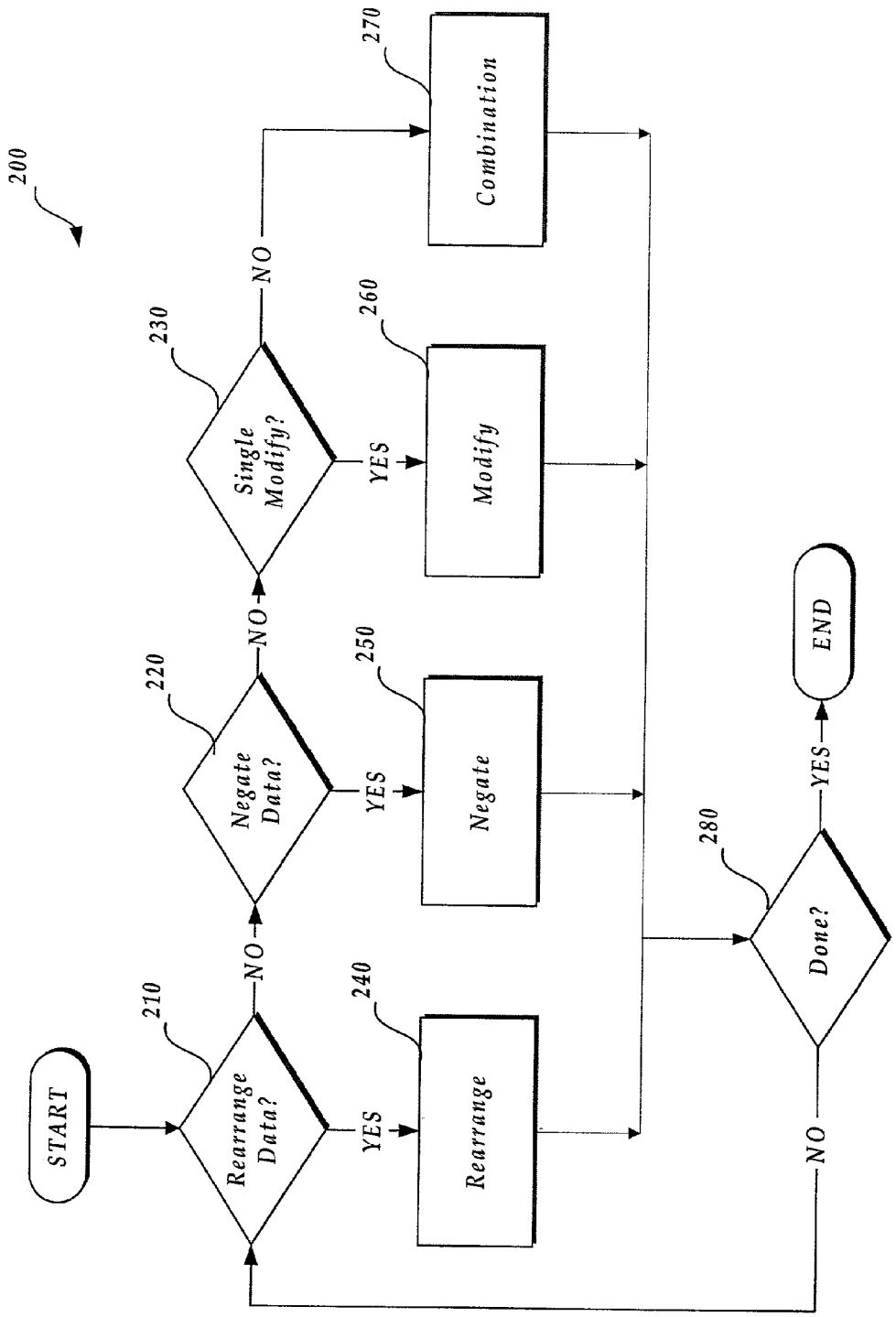
FIG. 2 is a flowchart illustrating a process for transforming a plurality of input data values in accordance with the present invention.

But this process would yield a very large number of factors. The number of factors can be drastically reduced if we work with a family of factor matrices more general than the elementary matrices but still allowing easy bounded-error integer approximations. The matrices we will use here are the unit triangular matrices, which are (lower or upper) triangular matrices whose diagonal entries are all 1. (Note that any elementary matrix is unit triangular.) FIG. 2 illustrates the process followed to generate the elementary matrices, permutation matrices and diagonal matrix used in the present invention.

Suppose we have a unit upper triangular matrix $$U = \begin{pmatrix} 1 & a_{12} & a_{13} & \cdots & a_{1n} \\ 0 & 1 & a_{12} & \cdots & a_{2n} \\ 0 & 0 & 1 & \cdots & a_{3n} \\ \vdots & \vdots & \vdots & \ddots & \vdots \\ 0 & 0 & 0 & \cdots & 1 \end{pmatrix},$$

so that $$U\begin{pmatrix} x1 \\ x2 \\ x3 \\ \vdots \\ x_n \end{pmatrix} = \begin{pmatrix} x_1 + a_{12}x_2 + a_{13}x_3 + \cdots + a_{1n}x_n \\ x_2 + a_{23}x_3 + \cdots + a_{2n}x_n \\ x_3 + \cdots + a_{3n}x_n \\ \vdots \\ x_n \end{pmatrix},$$

Then we can approximate U by $$\varphi\begin{pmatrix} x_1 \\ x_2 \\ \vdots \\ x_n \end{pmatrix} = \begin{pmatrix} x_1 + \langle a_{12}x_2 + a_{13}x_3 + \cdots + a_{1n}x_n \rangle \\ x_2 + \langle a_{23}x_3 + \cdots + a_{2n}x_n \rangle \\ \vdots \\ x_n \end{pmatrix}.$$

This will give $\|Ux-\varphi x\| \leq \sqrt{n-1}/2$ for all integer vectors x. And $\varphi$ is invertible: if $$\varphi\begin{pmatrix} x_1 \\ x_2 \\ \vdots \\ x_n \end{pmatrix} = \begin{pmatrix} y_1 \\ y_2 \\ \vdots \\ y_n \end{pmatrix},$$

then $$x_n = y_n,$$

$$x_{n-1} = y_{n-1} - \langle a_{n-1,n} x_n \rangle,$$

$$x_{n-2} = y_{n-2} - \langle a_{n-2,n-1} x_{n-1} + a_{n-2,n} x_n \rangle,$$

$$\vdots$$

$$x_1 = y_1 - \langle a_{12} x_2 + \cdots + a_{1n} x_n \rangle.$$

Note that φ can be computed in place (output entries overwriting input entries) if the output entries are computed in the order $y_1, y_2, \ldots, y_n$; $\phi^{-1}$ can also be computed in place, with the results computed downward from $x_n$ to $x_1$.

Again we find that $\phi^{-1}$ is not the same as the integer approximation to the matrix $U^{-1}$ (which is also unit upper triangular). The difference here is more substantial than in the 2×2 case. For instance, if n=3 and we apply the approximation for U and then the approximation for $U^{-1}$ to the starting integer vector $(x_1, x_2, x_3)$, the first coordinate of the result will be $$x_1 + \langle a_{12}x_2 + a_{13}x_3 \rangle + \langle -a_{12}x_2 - a_{13}x_3 + a_{12}(a_{23}x_3 - \langle a_{23}x_3 \rangle) \rangle,$$

which is quite likely to be different from $x_1$ even without boundary effects in the rounding rule. (In fact, the recursion displayed above in the computation of $\phi^{-1}$ tends to result in larger error bounds for the inverse transform than for the forward transform.)

The same approximation method works for a unit lower triangular matrix; one merely has to compute the output coordinates in the reverse order. (Again, one can convert between upper triangular and lower triangular using conjugation by a reverse-diagonal matrix J.) Actually, there are variants where the coordinates are computed in any specified order; these are obtained by combining a unit triangular matrix with a 'permutation' matrix.

Since a general matrix of determinant 1 can be factored into elementary matrices, it certainly can be factored into unit triangular matrices. The main question now is how many unit triangular factors are required in general. A quick lower bound can be obtained by counting degrees of freedom (free parameters). The general matrix of determinant 1 has $n^2-1$ degrees of freedom. A unit triangular matrix has $(n^2-n)/2$ degrees of freedom; hence, at least three such factors are needed to handle the general matrix (assuming n>1).

Note that a product of unit upper triangular matrices is unit upper triangular, and a product of unit lower triangular matrices is unit lower triangular. So, in a factorization into unit triangular matrices, we may assume that the two types of matrix alternate.

We just saw that a product of two unit triangular matrices is not general enough to give an arbitrary matrix of determinant 1. It turns out that the family of matrices that can be expressed as a product of two unit triangular matrices, say in the order LU, is an interesting one. One of ordinary skill in the art would be capable of expressing matrices as a product of two unit triangular matrices since such results are related to the method of expressing the diagonal entries of the upper triangular factor in a standard LU-decomposition as quotients of determinants of leading square submatrices of the original matrix.

Proposition 3.1. An n×n matrix $A=(a_{ij})_{n,n}$ can be expressed in the form LU (L unit lower triangular, U unit upper triangular) if and only if, for each k≦n, the leading k×k submatrix of A (i.e., the upper left k×k submatrix of A, or $(a_{ij})_{k,k}$, or A ↾k×k) has determinant 1.

Proof. (⇒) It is easy to see from the special forms of L and U that (LU) ↾k×k=(L ↾k×k) (U ↾k×k) for any k≦n. Since L ↾k×k and U ↾k×k obviously have determinant 1, (LU) ↾k×k must have determinant 1.

(⇐) Suppose A has the specified leading-submatrix property. If we express the unknown L and U as $(b_{ij})_{n,n}$ and $(c_{ij})_{n,n}$ (so $b_{ii}=c_{ii}=1$, $b_{ij}=0$ for i<j, and $c_{ij}=0$ for i>j), then LU works out to be $$\begin{pmatrix} 1 & c_{12} & c_{13} & c_{14} & \cdots \\ b_{21} & 1+b_{21}c_{12} & c_{23}+b_{21}c_{13} & c_{24}+b_{21}c_{14} & \cdots \\ b_{31} & b_{32}+b_{31}c_{12} & 1+b_{32}c_{23}+b_{31}c_{13} & c_{34}+b_{32}c_{24}+b_{31}c_{14} & \cdots \\ b_{41} & b_{42}+b_{41}c_{12} & b_{43}+b_{42}c_{23}+b_{41}c_{13} & 1+b_{43}c_{34}+b_{42}c_{24}+b_{41}c_{14} & \cdots \\ \vdots & \vdots & \vdots & \vdots & \ddots \end{pmatrix}.$$

So we can set $b_{i1}$ and $c_{i1}$ so that the entries of LU in the first column (below the diagonal) and the first row (right of the diagonal) will match the corresponding entries of A. Then we can set $b_{i2}$ and $c_{2i}$ so that the remaining off-diagonal entries in the second row and column of LU match those of A. Continuing this way, we obtain matrices L and U of the required form so that all off-diagonal entries of LU match the corresponding entries of A.

Using the fact that A and LU both have the property that all leading square submatrices have determinant 1, we now show by induction on k that the k'th diagonal entry of LU is $a_{kk}$. Suppose this is true for all k'<k. Then A ↾k×k and (LU) ↾k×k agree except possibly at the lower right entry. If we treat $a_{kk}$ as an unknown, then the equation det(A↾k×k)=1 is a linear equation for $a_{kk}$ and the coefficient of $a_{kk}$ is det(A ↾(k-1)×(k-1))=1, so $a_{kk}$ is uniquely determined. The lower right entry of (LU) ↾k×k satisfies exactly the same equation, so it must be equal to $a_{kk}$.

Therefore, A=LU, as desired.

The right-to-left direction could be proved more briefly as follows: given the matrix A, perform the standard LU-decomposition (no pivoting is needed) to write A as a product of a unit lower triangular matrix and a general upper triangular matrix; then, from the above, the diagonal entries of the second factor will all be 1. A more explicit proof was presented above to show the simplifications that arise in this special case.

In fact, given a suitable matrix $A=(a_{ij})_{n,n}$, there is a quite simple algorithm to compute matrices $L=(b_{ij})_{n,n}$ and $U=(c_{ij})_{n,n}$ as above. Start by setting $x_{ij} \leftarrow a_{ij}$ for all i, j≦n, and do:

for k = 1 to n − 1 (3.1)

for i = k + 1 to n for j = k + 1 to n $x_{ij} \leftarrow x_{ij} - x_{ik} x_{kj}$ Then we will have $x_{ij}=b_{ij}$ for i>j and $x_{ij}=c_{ij}$ for i<j (and $x_{ii}=1$).

By reversing the indices both horizontally and vertically, we see that a matrix can be written in the form UL (with L and U as above) if and only if all of its lower right square submatrices have determinant 1.

To handle more general matrices of determinant 1, we need more than two factors. It turns out that three factors (along with a possible 'permutation') will always suffice. In fact, since three factors give more degrees of freedom than we need, we can be more specific by requiring one of the three unit triangular factors to have a special form.

Proposition 3.2. Let $A=(a_{ij})_{n,n}$ be an n×n matrix of determinant 1 such that all of the submatrices $(a_{i+1,j})_{k,k}$ for $1 \leq k \leq n-1$ have nonzero determinant. Then A can be written in the form $U_1LU$ where $U_1$ and U are unit upper triangular, L is unit lower triangular, and the only nonzero entries of $U_1$ are on the diagonal or the top row.

Proof. We first find a matrix A' differing from A only in the first row so that all leading square submatrices of A' have determinant 1. Let $a'_{11}, a'_{12}, \ldots, a'_{1n}$ denote the unknown entries of the first row of A'. Then, once we know $a'_{11}$, $a'_{12}, \ldots, a'_{1,k-1}$, we can determine $a'_{1k}$ so that A' ↑k×k will have determinant 1. This condition is a linear equation for $a'_{1k}$ and the coefficient of the linear term is ±det $(a_{i+1,j})_{k-1,k-1}$ (define this to be 1 for k=1), which is nonzero by assumption, so there is a (unique) value which works for $a'_{1k}$. So we can proceed from left to right to determine all of the unknown entries of A'.

If we can find a matrix $U_1$ of the required form so that $A=U_1A'$, then we can use Proposition 3.1 to express A' in the form LU for unit triangular matrices L and U, giving $A=U_1LU$ as desired. Let $1, u_2, u_3, \ldots, u_n$ denote the entries of the first row of $U_1$. Then the unknown values $u_i$ must satisfy the equations $a_{21}u_2 + a_{31}u_3 + \cdots + a_{n1}u_n = a_{11} - a'_{11}$, $a_{22}u_2 + a_{32}u_3 + \cdots + a_{n2}u_n = a_{12} - a'_{12}$, $\vdots$ $a_{2n}u_2 + a_{3n}u_3 + \cdots + a_{nn}u_n = a_{1n} - a'_{1n}$.

If we just look at the first n−1 of these equations, then the (n−1)×(n−1) matrix of coefficients is $(a_{i+1,j})_{n-1,n-1}^T$, which has nonzero determinant, so there are unique numbers $u_2, \ldots, u''$ satisfying these n−1 equations. This means that the resulting matrix $U_1$ will be such that $U_1A'$ agrees with A everywhere except possibly at the upper right corner entry. But A and $U_1A'$ both have determinant 1, and the cofactor of the upper right corner in the computation of these determinants is det $(a_{i+1,j})_{n-1,n-1} \neq 0$, so A and $U_1A'$ must in fact agree everywhere.

The special case n=2 of this proposition is of interest; it states that any 2×2 matrix $$A = \begin{pmatrix} a_{11} & a_{12} \\ a_{21} & a_{22} \end{pmatrix}$$

of determinant 1 with $a_{21} \neq 0$ can be written as a product of three elementary matrices. It is not hard to work out this factorization explicitly:

$$A = \begin{pmatrix} 1 & \frac{a_{11}-1}{a_{21}} \\ 0 & 1 \end{pmatrix} \begin{pmatrix} 1 & 0 \\ a_{21} & 1 \end{pmatrix} \begin{pmatrix} 1 & \frac{a_{22}-1}{a_{21}} \\ 0 & 1 \end{pmatrix}. \quad (3.2)$$

By transposing everything and reversing the order of the factors, we get a similar factorization for a 2×2 matrix of determinant 1 with upper right entry nonzero. So it is only the diagonal matrices which require four factors as discussed above in the section devoted to the 2×2 diagonal matrix. (It is not hard to show that a non-identity 2×2 diagonal matrix cannot be written as a product of elementary factors without using at least two upper factors and two lower factors—for instance, if only one lower factor is used, then the nonzero lower left entry of this factor will be the same as the lower left entry of the product.)

A given matrix of determinant 1 might not satisfy the hypothesis of Proposition 3.2, but this problem can be handled by a small modification of the matrix. Given any nonsingular matrix, one can permute the rows so as to get all leading square submatrices to have nonzero determinant. (Expand the determinant of the matrix by minors on the last column; since the determinant is nonzero, one of these minors has nonzero determinant. So we can swap rows so that the leading (n−1)×(n−1) submatrix has nonzero determinant. Now proceed recursively.) Then we can move the last row up to the top (and negate it if necessary to restore the determinant to +1) to get a matrix satisfying the hypotheses of Proposition 3.2. Therefore:

Theorem 3.3. Any matrix of determinant 1 can be factored in the form $\Pi U_1 LU$, where $\Pi$ is a signed permutation matrix, $U_1$ and U are unit upper triangular, L is unit lower triangular, and the only nonzero entries of $U_1$ are on the diagonal or the top row.

There is a version of Theorem 3.3 which applies to any nonsingular matrix A: one can factor A in the form $\Pi \overline{U}_1 LU$ where $\Pi$ is a 'permutation' matrix, L is unit lower triangular, U is unit upper triangular, and $\overline{U}_1$ is a matrix which differs from the identity matrix only in its first row. (So $\overline{U}_1$ is like $U_1$ except that the upper left entry of $U_1$ may differ from 1.) To see this, first note that the argument just before Theorem 3.3 applies here to find a 'permutation' $\Pi$ such that $A = \Pi \overline{A}$ where $\overline{A}$ is such that the submatrices specified in Proposition 3.2 have nonzero determinant. Let d be the determinant of $\overline{A}$, and let A' be $\overline{A}$ with its first row divided by d. Apply Proposition 3.2 to factor A' in the form $U_1 LU$, and let $\overline{U}_1$ be $U_1$ with its first row multiplied by d; then we have $A = \Pi \overline{U}_1 LU$ as desired.

By tracing through the proofs leading up to Theorem 3.3, one can extract an algorithm for factoring a matrix of determinant 1 in the specified form, but it will not be a good algorithm. In particular, instead of using trial and error with subdeterminants to choose a 'permutation' $\Pi$, we would like to have a method 300 that works faster and produces more numerically stable results. It turns out that the standard LU-decomposition algorithm provides just what is needed.

Figure 3:
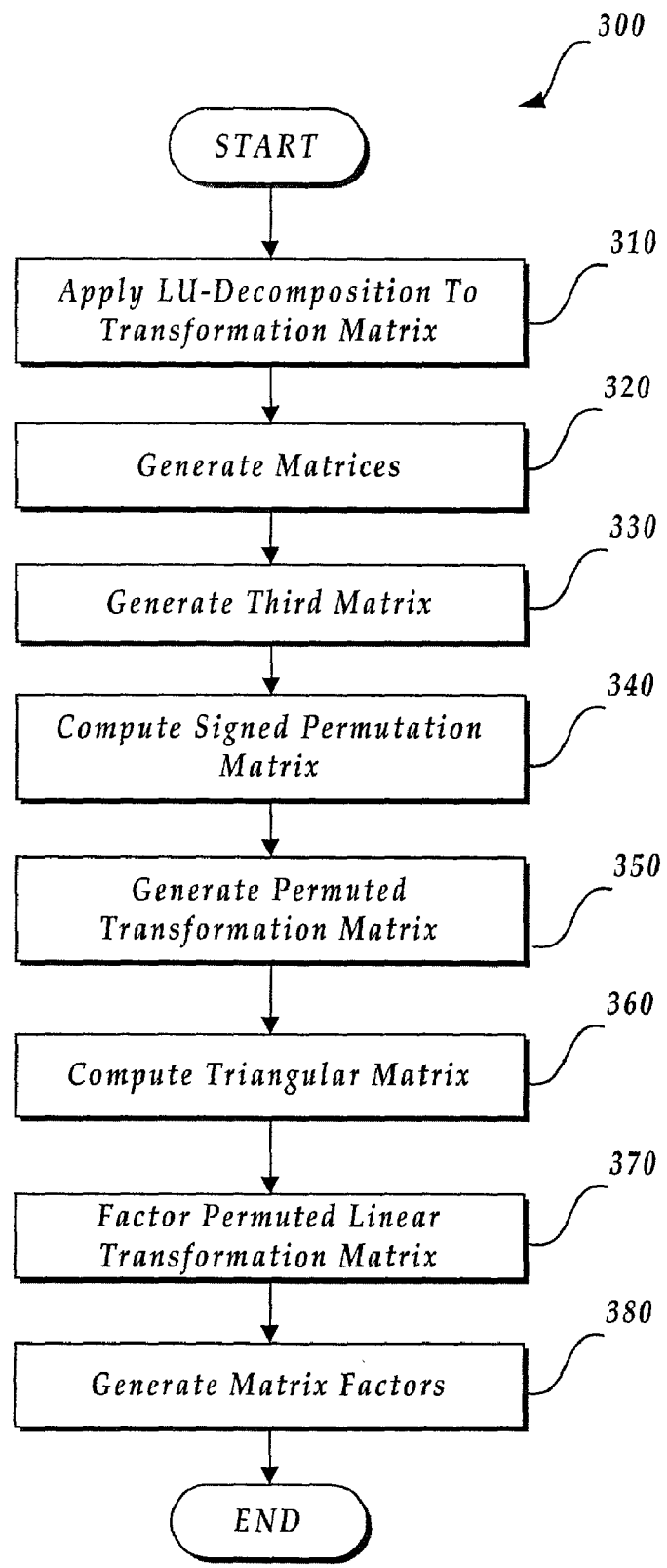
FIG. 3 is a flowchart illustrating a process for generating matrix factors for a finite-dimensional linear transform in accordance with the present invention.
Figure 4:
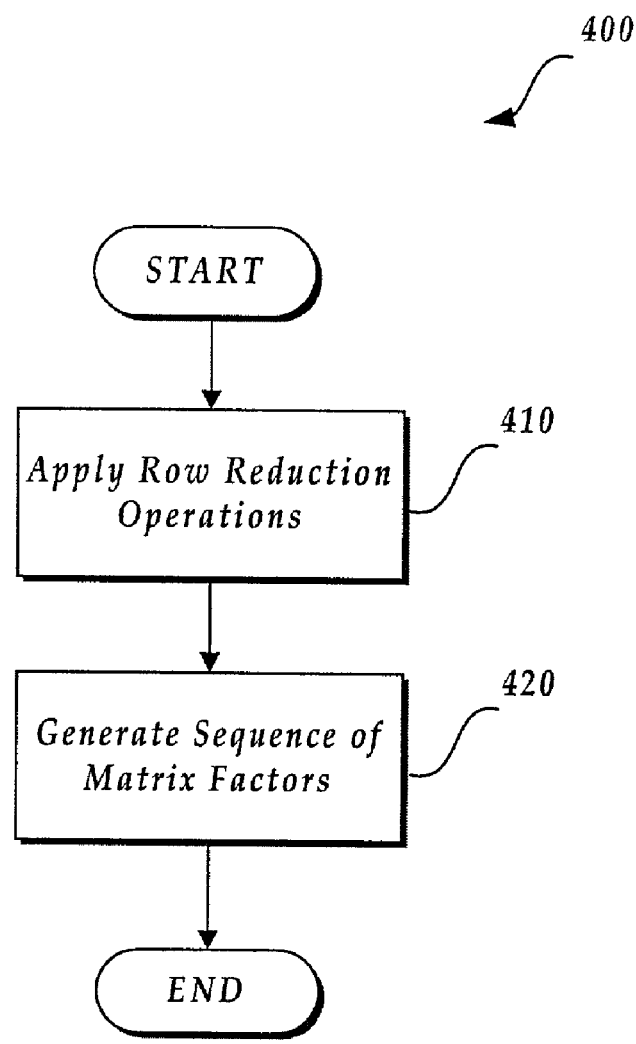
FIG. 4 is a flowchart illustrating a process for generating matrix factors for a wavelet transform stored in a transformation matrix in accordance with the present invention.

FIG. 3 illustrates a method 300 for generating matrix factors for a given matrix A of determinant 1. Gaussian elimination can be performed on this matrix using elementary operations and permutations on the rows only (partial pivoting) to reduce the matrix to upper triangular form 310. This means that we get the equation $\tilde{\Pi}A=\tilde{L}\tilde{D}\tilde{U}$, where $\tilde{\Pi}$ is a permutation, $\tilde{L}$ is unit lower triangular, and $\tilde{D}\tilde{U}$ is upper triangular 320 (it could be factored further into a diagonal matrix $\tilde{D}$ and an unit upper triangular matrix $\tilde{U}$, but we will not need that here). Note that $(\tilde{L}\tilde{D}\tilde{U})\upharpoonright k\times k = (\tilde{L}\upharpoonright k\times k)(\tilde{D}\tilde{U}\upharpoonright k\times k)$ and the latter two matrices have nonzero determinant (the determinant of $\tilde{D}\tilde{U}\upharpoonright k\times k$ is the product of its diagonal entries, which is nonzero because the product of all of the diagonal entries of $\tilde{D}\tilde{U}$ is $\tilde{D}\tilde{U}=(\det(\tilde{\Pi}A))/(\det\tilde{L})=\pm1$.

So now we can take $\tilde{\Pi}A$ transfer the bottom row to the top, and negate this row if necessary so that the resulting matrix $\hat{A}$ will have determinant 1; then $\hat{A}$ is a 'permuted' version of A (step 350) which satisfies the hypotheses of Proposition 3.2.

Let $\sigma=\det\tilde{\Pi}$ be the sign of the permutation given by $\tilde{\Pi}$. Then the top row of $\hat{A}$ is the bottom row of $\tilde{\Pi}A$ multiplied by $(-1)^{n+1}\sigma$, and we have $\hat{A}=\hat{\Pi}A$, where $\hat{\Pi}$ is $\tilde{\Pi}$ with its bottom row moved to the top and multiplied by $(-1)^{n+1}\sigma$ (step 340). Now we can write $A=\Pi\hat{A}$, where $\Pi=\hat{\Pi}^{-1}=\hat{\Pi}^T$. Note that $\hat{\Pi}$ and $\Pi$ are 'permutation' matrices.

Once we have the Proposition 3.2 decomposition $U_1LU$ of $\hat{A}$, we will have factored A into the form $\Pi U_1LU$, as desired. We will now see that knowing the decomposition $\tilde{L}\tilde{D}\tilde{U}$ of $\tilde{\Pi}A$ makes it much easier to compute the matrices $U_1$, L, and U.

The matrix $\hat{A}$ has the form $$\begin{pmatrix} \hat{a}_{11}\hat{a}_{12}\hat{a}_{13}\cdots\hat{a}_{1n} \\ (\tilde{\Pi}A)\upharpoonright(n-1)\times n \end{pmatrix},$$

where the numbers $\hat{a}_{1i}$ are the bottom row of $\tilde{\Pi}A$ (possibly negated) (step 330). The modified matrix A' from the proof of Proposition 3.2 will have the form $$\begin{pmatrix} a'_{11}\ a'_{12}\ a'_{13}\cdots a'_{1n} \\ (\tilde{\Pi}A)\upharpoonright(n-1)\times n \end{pmatrix},$$

where the numbers $a'_{1i}$ are to be chosen so that the leading square submatrices of A' all have determinant 1 (step 350).

One obtains $\tilde{D}\tilde{U}$ from $\tilde{\Pi}A$ by performing elementary row operations as specified by $\tilde{L}$; each of these operations adds a multiple of an earlier row to a later row. If one performs the same operations (shifted down one row) to the lower n−1 rows of the matrix A', one obtains the matrix $$A''=\begin{pmatrix} a'_{11}\ a'_{12}\ a'_{13}\cdots a'_{1n} \\ \tilde{D}\tilde{U}\upharpoonright(n-1)\times n \end{pmatrix},$$

Since these operations again only add multiples of earlier rows to later rows, they are still valid row operations when restricted to any leading square submatrix of the matrix, so they do not change the determinants of these submatrices. So if we find values for $a'_{1i}$ so that the leading square submatrices of A" all have determinant 1, then the leading square submatrices of A' will also have determinant 1.

Let $v_{ij}$ for $1\leq i,j\leq n$ be the entries of the matrix $\tilde{D}\tilde{U}$; then $v_{ij}=0$ for $i>j$. Also, let $\bar{d}_k=v_{11}v_{22}\ldots v_{kk}$ (the product of the first k diagonal entries of $\tilde{D}\tilde{U}$; this is equal to the determinant of the leading k×k submatrix of $\tilde{D}\tilde{U}$ or of $\tilde{\Pi}A$). Then one can derive the following formula for the desired values $a'_{1k}$:

$$a'_{1k}=\sum_{i=1}^{k}(-1)^{i+1}\frac{v_{ik}}{\bar{d}_i}. \tag{3.3}$$

This can be re-expressed in various ways: since $v_{kk}/\bar{d}_k=1/\bar{d}_{k-1}$, one can combine the last two terms into $\pm(v_{k-1,k}-1)/\bar{d}_{k-1}$ and, instead of computing the products $\bar{d}_k$, one can write the formula in Horner form $$a'_{1k}=\frac{1}{v_{11}}\left(v_{1k}-\frac{1}{v_{22}}\left(v_{2k}-\frac{1}{v_{33}}(v_{3k}-\cdots)\right)\right).$$

Once we have A', it is easy to factor it into the form LU, as described earlier. It now remains to find the matrix $U_1$ so that $\hat{A}=U_1A'$. As noted in the proof of Proposition 3.2, this requires solving a system of n−1 linear equations in n−1 unknowns $u_2, u_3, \ldots, u^n$, and the matrix of coefficients for this system is the transpose of the lower left (n−1)×(n−1) submatrix of $\hat{A}$ (step 360). But this is just $((\tilde{\Pi}A)\upharpoonright(n-1)\times(n-1))^T$, and the known factorization of $\tilde{\Pi}A$ into two triangular matrices immediately gives such a factorization for this matrix:

$$((\tilde{\Pi}A)\upharpoonright(n-1)\times(n-1))^T=(\tilde{D}\tilde{U}\upharpoonright(n-1)\times(n-1))^T(\tilde{L}\upharpoonright(n-1)).$$

Using this, we can easily solve for the unknown values $u_2, \ldots, u_n$, thus completing our desired factorization of A.

In summary, the method 300 for factoring the determinant-1 matrix A into the form $\Pi U_1LU$ is:

(1) Use a standard LU-decomposition algorithm (Gaussian elimination with partial pivoting) to find $\tilde{\Pi}$, $\tilde{L}$, and $\tilde{D}\tilde{U}$ so that $\tilde{\Pi}A=\tilde{L}\tilde{D}\tilde{U}$. Keep track of the number k of row interchanges performed during this process, and let $\hat{\sigma}=(-1)^{n+1+k}$.

(2) Compute $\tilde{\Pi}A$. (Perhaps this will be done during step (1).)

(3) Multiply the (unique nonzero entry in the) bottom row of $\tilde{\Pi}$ by $\sigma$, move this bottom row up to the top (moving all the other rows down by 1), and take the transpose (i.e., invert the permutation) to get $\Pi$.

(4) Let $\hat{a}$ be the bottom row of $\tilde{\Pi}A$ multiplied by $\hat{\sigma}$.

(5) Compute the numbers $a'_{11}, a'_{12}, \ldots, a'_{1n}$ from $\tilde{D}\tilde{U}$ according to formula (3.3), and let a' be the row vector $(a'_{11}, a'_{12}, \ldots, a'_{1n})$.

(6) Using standard backsolving techniques for triangular matrices (but reversed), find the row vector u satisfying the equation $u\tilde{L}\tilde{D}\tilde{U}=\hat{a}-a'$. Let $U_1$ be an n×n identity matrix with the second through n'th entries in its first row replaced by the first through (n−1)'th entries of u.

(7) Form the matrix A' consisting of the row a' followed by the first n−1 rows of $\tilde{\Pi}A$ (step 370). Apply (3.1) to A' to compute the entries of the matrices L and U.

Note that the last entry in the row vectors â and u will not be used and need not be computed. Also note that the nontrivial numbers in the matrices $U_1$, L, and U can easily be packed into a single n×n matrix (with one number to spare).

The form $\Pi U_1 LU$ is only one possible form for a factorization of a given matrix A of determinant 1 (step 380); there are many other options for factoring A into unit triangular matrices and a 'permutation' matrix. For instance, one could factor A in the form $\Pi L''UL$, where $L''$ is unit lower triangular with nonzero off-diagonal entries only on the n'th row. (To get this, reverse the coordinates of A, factor in the form $\Pi U_1 LU$, and reverse again. In other words, conjugate by the reverse-diagonal matrix J.) Another possibility is the form $LUL^1\Pi$, where $L^1$ is unit lower triangular with its nonzero entries in the first column. (Transpose A, factor in the form $\Pi U_1 LU$, and transpose again, reversing the order of factors.) Yet another possibility is to use full pivoting rather than partial pivoting in the initial LU-decomposition, leading to a factorization $A=\Pi U_1 LU\Pi_2$ with two 'permutation' matrices.

The form $U_1$ is particularly suitable for integer approximation purposes, because the integer approximation for this factor requires only one coordinate to be rounded; thus, the error bound for this factor is ½, as opposed to $\sqrt{n-1}/2$ for the general unit triangular matrix. The same applies to the form $L''$, but not to the form $L^1$.

But it is good to have as many options as possible, so one can look for a factorization that gives the best error bounds for the integer approximation as a whole, just as described in the section entitled "The 2×2 Diagonal Matrix."

Preserving Particular Lattice Points

In some cases the linear transformation A already sends some integer lattice points to integer lattice points. This may be a fundamental property of the transformation, in which case it will be highly desirable to have the approximating integer map φ match A exactly on these particular points. An example of this situation is presented in the next section.

One particular case of this is handled automatically by the factorization shown in the section entitled "Larger Matrices." Suppose that we have $Ae_1=e_1$, where $e_1$ is the elementary vector with first entry 1 and remaining entries 0. This is equivalent to A having first column equal to $e_1$. Then we have $A(ke_1)=ke_1$ for all integers k, and we would like to have $\phi(ke_1)=ke_1$ also. This turns out to be the case:

Proposition 4.1. Any matrix A of determinant 1 such that $Ae_1=e_1$ can be factored in the form $\Pi U_1 LU$, where $\Pi$ is a signed permutation matrix, $U_1$ and U are unit upper triangular, L is unit lower triangular, the only nonzero entries of $U_1$ are on the diagonal or the top row, and the integer approximation φ to A resulting from this factorization satisfies $\phi(ke_1)=ke_1$ for all integers k.

Proof. Follow the algorithm shown in the section entitled "Larger Matrices." The first step is to use Gaussian elimination with partial pivoting to obtain the expression $\tilde\Pi A = \tilde L \tilde D \tilde U$. But the initial matrix A already has its first column in the desired form, so the elimination will leave the first row alone and process the remaining rows in order to handle columns 2 through n. Therefore, we get $\tilde\Pi e_1 = e_1$, and the related matrix $\Pi$ will satisfy $\Pi(ke_2)=ke_1$ (where $e_2$ has a 1 in the second position and 0's elsewhere). And the matrix A remaining to be factored has first column $e_2$.

The entry in position (1, 2) of A (call it $a_{12}$) becomes the entry in position (2, 2) of Â. When the matrix A' is computed in the next step, its first column is $e_1+e_2$, and the second entry in row 1 comes out to be $a'_{12}=a_{12}-1$. We then get $u_2=-1$, and the first column of the matrix L is also $e_1+e_2$.

So we get the following when applying the matrix A in factored form $\Pi U_1 LU$ to the vector $ke_1$: $U(ke_1)=ke_1$, $L(ke_1)=k(e_1+e_2)$, $U_1(k(e_1+e_2))=ke_2$, and $\Pi(ke_2)=ke_1$. In the corresponding integer approximation, each step of this process is an integer vector anyway, and hence is not altered by rounding. Therefore, we get $\phi(ke_1)=ke_1$ for all integers k.

Other cases where the matrix A happens to map certain integer vectors to integer vectors will probably not be preserved exactly by this integer approximation. However, if there is a particular integer vector one is interested in preserving, one may be able to apply a preliminary integral linear transformation to move this vector to $e_1$ before factoring. For instance, suppose that the linear transformation A maps k1 to $ke_1$, where 1 is the vector with all entries equal to 1. Then we can write A as $\bar A\Delta$, where $\Delta$ is a simple integer matrix of determinant 1 which maps 1 to $e_1$. Then we have $\bar Ae_1=e_1$, so we can factor $\bar A$ as above to get a factorization $\Pi U_1 LU\Delta$ of A yielding an integer approximation φ which sends k1 to $ke_1$.

EXAMPLE

The RGB→$YC_BC_R$ Matrix

As an example, we consider a transformation for conversion of colors presented in standard red-green-blue coordinates. Here we will consider only linear changes of coordinates, ignoring nonlinear visual effects, which are not relevant for the purposes below. A popular coordinate system used for these purposes is the $YC_BC_R$ coordinate system, described in the International Telecommunications Union standards document ITU-R BT.601.

Coordinate systems such as $YC_BC_R$ may be more desirable for image transmission and/or compression, because they decrease wasteful correlations between the three coordinates (brighter parts of an image will tend to have higher values for all three coordinates) and because coordinate systems in which the most important part of the signal (brightness or something like it) is separated out allow different amounts of bandwidth to be used for the different coordinates. These purposes would appear incompatible with the goal of invertibility; however, it is often desirable for a compression or transmission system to be able to operate in either lossless mode or a lossy compressed mode, so it is not unreasonable to ask for a lossless transformation from RGB to $YC_BC_R$.

The RGB→$YC_BC_R$ conversion is actually a family of linear transformations; a particular member of this family is specified by giving weights $a_R$, $a_G$, $a_B$ (positive numbers summing to 1) for the R, G, and B components. The matrix corresponding to these weights is $$A = \begin{pmatrix} a_R & a_G & a_B \\ \dfrac{-a_R}{2-2a_B} & \dfrac{-a_G}{2-2a_B} & \dfrac{1}{2} \\ \dfrac{1}{2} & \dfrac{-a_G}{2-2a_R} & \dfrac{-a_B}{2-2a_R} \end{pmatrix}.$$

The determinant of this matrix is not 1 but $$\frac{a_G}{4(1-a_R)(1-a_B)}$$

This is not a serious problem, though, because for decorrelation purposes it does not matter if a scale factor is applied to the $C_R$ and/or $C_B$ output components, and the scale factors can be allowed for explicitly in differential data rates. (We do not want to rescale the Y component, for reasons given below.) We might as well use the same scale factor for both of these components. This means that the first step is to pull out a scaling matrix $$S = \begin{pmatrix} 1 & 0 & 0 \\ 0 & \beta & 0 \\ 0 & 0 & \beta \end{pmatrix}$$

(on the left) from A, where $$\beta = \frac{1}{2}\sqrt{\frac{a_G}{(1-a_R)(1-a_B)}},$$

leaving a matrix $S^{-1}A$ of determinant 1 to factor.

The Y output component represents the total luminance (perceived brightness) of the specified color. In particular, if the input color is a greyscale value with all three components equal to the same number k, then the Y component of the output will be k. (This is why Y should not be rescaled.) The other two components are orthogonal to the black-white axis; they come out to be zero for greyscale input. In other words, we are in the situation described at the end of the previous section: for any k, we have $A(k1)=ke_1$ (and hence $(S^{-1}A)(k1)=ke_1$, since S fixes $e_1$). To ensure that the integer approximation map preserves this property, we start by pulling out a factor $\Delta$ on the right such that $\Delta$ has determinant 1 and sends 1 to $e_1$. There are many such matrices to choose from; one simple one is $$\Delta = \begin{pmatrix} 1 & 0 & 0 \\ -1 & 1 & 0 \\ -1 & 0 & 1 \end{pmatrix}.$$

We are now left with a matrix $\bar{A}=S^{-1}A\Delta^{-1}$ to which the algorithms from the section entitled "Larger Matrices" can be applied. These yield the factorization $$S^{-1}A=\Pi U_1 LU\Delta$$

where $$\Pi = \begin{pmatrix} 0 & 1 & 0 \\ 0 & 0 & 1 \\ 1 & 0 & 0 \end{pmatrix}, \quad U_1 = \begin{pmatrix} 1 & -1 & t_1 \\ 0 & 1 & 0 \\ 0 & 0 & 1 \end{pmatrix},$$

$$L = \begin{pmatrix} 1 & 0 & 0 \\ 1 & 1 & 0 \\ 0 & t_2 & 1 \end{pmatrix}, \quad U = \begin{pmatrix} 1 & a_G-1 & t_3 \\ 0 & 1 & t_4 \\ 0 & 0 & 1 \end{pmatrix},$$

and the entries $t_i$ are given by:

$$t_1 = \frac{1-a_B}{1-a_R} - \frac{(2-2a_B)\beta}{a_G}$$

$$t_2 = -\frac{a_G}{(2-2a_B)\beta}$$

$$t_3 = a_B + 1 - \frac{(2-2a_B)\beta - a_R}{a_G}$$

$$t_4 = \frac{(2-2a_B)\beta - a_R}{a_G} - 1$$

A special case of interest is presented by the set of values provided in the ITU-R BT.601 standard, which values are as follows:

$a_R$=0.299, $a_G$=0.587, $a_B$=0.114.

In this case, the numerical values of the non-integer entries in the above matrices are:

$\beta \approx$0.4860860807044331 $a_G$−1=−0.413
$t_1 \approx$−0.2034584787387865 $t_3 \approx$0.1560024957269925
$t_2 \approx$−0.6814926851476152 $t_4 \approx$−0.0420024957269925

We can now apply the error analysis methods presented earlier to obtain error bounds for this transformation. Note that the integer isometry $\Pi$ has no effect on the errors and can be ignored. The integer approximations to matrices $U_1$ and L only involve one rounding, because these matrices have only one non-integer row each; so the error bound for each of these matrices is ½, while the error bound for U (which has two non-integer rows) is $\sqrt{2}/2$. The error bound for the integer matrix $\Delta$ is 0. After computing the norms $\|U_1\| \approx$1.6328964907799118, $\|U_1 L\| \approx$1.6965471828414659, and $\|U_1 LU\| \approx$1.4371952820317682, we can apply (1.2) to get a forward error bound of 2.5160882629800899. Since the inverse to the integer approximation is computed differently, we cannot bound its error by applying (1.2) directly; instead we compute $\|(S^{-1}A)^{-1}\| \approx$1.8003448245653902 and apply (1.3) to get an inverse error bound of 4.5298264824059275.

One gets better bounds by keeping track of the errors from the separate roundings as discussed in the section entitled "The 2×2 Diagonal Matrix". Under the worst-case assumption that these errors are independent, one gets error bounds of 1.5472559440649816 for the forward transform and 1.7941398552787594 for the inverse transform.

One can get lower bounds on the error (and thus gauge the accuracy of the preceding upper bounds) by testing the approximation on a large collection of sample inputs. One can reduce the computation needed here by using the fact that the factorization preserves the mapping $k1 \mapsto ke_2$. If one applies the approximation to x and to x+k1, then at every step the two results will be the same except that the second result will have k added to some coordinates; in particular, the rounding errors will be exactly the same. Similarly, the inverse to the approximation will give exactly the same errors for input vectors y and y+$ke_1$.

For the forward transform, a search through all input vectors $(x_1, x_2, x_3) \in Z^3$ with $|x_2-x_1|<$33000 and $|x_3-x_1|<$33000 (only these relative differences matter) yielded a largest error of 1.5404029289484810 at the input vector (19352, 0, 20840). For the inverse transform, a search through all input vectors $(x_1, x_2, x_3) \in Z^3$ with $|x_2|<$33000 and $|x_3|<$33000 (the value of $x_1$ is irrelevant) yielded a largest error of 1.7905956082490824 at the input vector (8360, 31316, 8995). These examples show that the upper bounds given above are either sharp or very close to it.

There were a number of choices made in the construction of this factorization (the form $\Pi U_1 LU$, the particular matrices S and $\Delta$, and so on). Different choices would lead to alternative factorizations, some of which might have better error bounds than the factorization presented here.

More General Bijections

As mentioned in the section entitled "Introduction", the approximation problem in the fixed-length case is equivalent to finding a bijection $\psi$ from a transformed lattice $AZ^n$ to the standard integer lattice $Z^n$ which moves points as small a distance as possible (so that the integer mapping $\phi = \psi \cdot A$ is a bijection approximating A). One can imagine many ways of trying to find such a bijection, $\psi$; the problem seems to be a combinatorial one.

Given a matrix A of determinant $\pm 1$, we know by now that such maps $\psi$ do exist so that the errors (the distances that points are moved) are bounded. Each such $\psi$ has a supremal error $\sup_{x \in AZ^n} \|\psi x - x\|$ (we cannot say "maximal error," because it may be that there is no single point x for which $\|\psi x - x\|$ is maximal). It is natural to ask whether there is a bijection $\psi$ which is optimal in the sense that its supremal error is as small as possible; it is conceivable that there would be no optimal bijection, because the ultimate error bound could be approached but not attained. This turns out not to be the case:

Proposition 6.1. For any real n×n matrix A of determinant $\pm 1$, there is a bijection $\psi: AZ^n \to Z^n$ which is optimal in the sense that $\sup_{x \in AZ^n} \|\psi x - x\|$ is minimal over all such bijections.

Proof. First find an integer approximation $\psi_1$ with bounded error, and let $\epsilon_1$ be an error bound for $\psi_1$. Then we only need to search among bijections with error bounded by $\epsilon_1$ to find an optimal one $\psi$. If $\epsilon_1$ is fixed, then there are only finitely many possibilities for $\psi x$ for any given $x \in AZ^n$ (i.e., only finitely many standard lattice points within distance $\epsilon_1$ of x) and only finitely many possibilities for $\psi^{-1} y$ for any given $y \in Z^n$.

Now a standard compactness argument can be used to complete the proof. There are several ways to express this argument. One is to note that the space of integer approximations $\psi$ satisfying the error bound $\epsilon_1$ can be given a metric (let $x_1, x_2, \ldots$ list the vectors in $AZ^n \cup Z^n$, and define the distance between distinct approximations $\psi$ and $\psi'$ to be $1/k$ where k is least so that $\psi x_k \neq \psi' x_k$ or $\psi^{-1} x_k \neq \psi'^{-1} x_k$) so that it becomes a compact space, and the supremal error is a lower semicontinuous function from this space to the real numbers, so it must attain a minimum value. Another is as follows: Let $\epsilon$ be the infimum of the supremal errors of approximations $\psi$. For any finite sets $S \subseteq AZ^n$ and $S' \subseteq Z^n$, there are only finitely many ways to partially define an integer approximation $\psi$ on S and S' (i.e., define $\psi x$ for $x \in S$ and $\psi^{-1} y$ for $y \in S'$) so as to meet the error bound $\epsilon_1$; so there must be one whose partial error bound on this finite configuration is as small as possible. Since one can find complete integer approximations with supremal errors as close as desired to $\epsilon$, the partial error bound must be at most $\epsilon$. So, for any finite parts of the domain and range lattices, we can define $\psi$ and $\psi^{-1}$ on these parts so as to attain the error bound $\epsilon$; and there are only finitely many ways to do so. Now we can apply König's infinity lemma to put these together to obtain a complete integer approximation attaining the bound $\epsilon$, which is therefore optimal.

In general, the optimal lattice bijection is not unique. Also, this proof is quite non-constructive, and it is not clear that the optimal bijection(s) will be implementable or describable in any useful way.

Let us now examine the case where the matrix A has rational entries. Then the transformed lattice $AZ^n$ will contain many points that are also in the standard lattice $Z^n$; in fact, the intersection $L = AZ^n \cap Z^n$ is a full n-dimensional lattice. (To see this, it is enough to get n independent vectors in L; one can do this by taking the n independent columns of A and multiplying each by its least common denominator to get an integer vector.) This means that the configuration of points in the two lattices is periodic: the configuration at x looks just like the configuration at x+a for any $a \in L$.

Now L is a subgroup of $Z^n$ of finite index (which can be computed by forming a matrix whose columns are n generating vectors for L and taking the absolute value of its determinant), and is a subgroup of $AZ^n$ with this same index (because the determinant of A is $\pm 1$). So one can pair off the L-cosets in $AZ^n$ with the L-cosets in $Z^n$. Any two cosets of L are translates of one another, and such a translation gives a bijection between the cosets. If we take such a translation from each L-coset in $AZ^n$ to the corresponding L-coset in $Z^n$, we get a bijection $\psi$ from $AZ^n$ to $Z^n$ which is of bounded error; in fact, the maximum error is the largest of the norms of the translation vectors used.

Just like the lattice configuration, the action of the mapping $\psi$ looks the same near x as near x+a for any $a \in L$. In fact, the displacement $\psi x - x$ is a periodic function of x. We will refer to such a bijection $\psi$ as a 'periodic' bijection, and to the corresponding integer approximation $\phi$ as a 'periodic' approximation.

There are only finitely many ways to pair off the L-cosets of the two lattices; and for each pair of cosets there are only finitely many translations from one to the other with translation vector of norm below a specified bound. (Given any point in the first coset, there are only finitely many points in the second coset within the specified distance of the given point; these give the finitely many translation vectors one can try. Clearly there is a best translation vector, although it may not be unique. In fact, the pairing between cosets can be thought of as a bijection between two finite lattices on the n-dimensional torus $R^n/L$ with a suitable metric.) So there are only finitely many 'periodic' bijections meeting any specified error bound; it follows that there must be an optimal 'periodic' bijection whose maximum error (in the 'periodic' case, a maximum error is attained) is as small as possible. It turns out that this is optimal among all bijections:

Proposition 6.2. For any rational n×n matrix A of determinant $\pm 1$, an optimal 'periodic' integer approximation to A will in fact be optimal among all integer approximations.

Proof. It suffices to show that, if there is any bijection $\psi$ from $AZ^n$ to $Z^n$ meeting error bound $\epsilon$, then there is a 'periodic' bijection meeting error bound $\epsilon$.

Let m be the index of L in $Z^n$ (and in $AZ^n$). Then, for any n-cube of side-length s, the number of points of any L-coset in the cube is $s^n/m + o(s^n)$. This means that we can find a large cube B and a positive natural number N such that every L-coset contains at least N points inside B and at most N+N/m points within distance $\epsilon$ of B (because they would lie in a slightly larger cube of side-length $s+2\epsilon$).

Now, for any $k \leq m$, if we put together k of the m cosets of L in $AZ^n$, we get at least kN points inside B. These are mapped by $\psi$ to at least kN points within distance $\epsilon$ of B.

These image points cannot be included in k−1 cosets of L in $Z^n$, because $$(k-1)(N+N/m) < kN$$

for k≤m. So the image points meet at least k cosets of L in $Z^n$.

Therefore, by the Marriage Theorem, there is a one-to-one pairing (hence a bijection) from the source cosets to the target cosets so that, if $C_i$ is paired with $C'_i$, then we can find $x_i \in C_i$ such that $\psi x_i \in C'_i$. Let $a_i = \psi x_i - x_i$; then $\|a_i\| \leq \epsilon$. Using this coset pairing and the translation vectors $a_i$, construct a 'periodic' bijection $\psi'$; then $\psi'$ meets the error bound $\epsilon$, as desired.

Propositions 6.1 and 6.2 also work if one is trying to optimize the approximation error for the inverse transform, or some combination of the forward and inverse errors (e.g., the maximum of the two). Note that the inverse of a 'periodic' approximation is a 'periodic' approximation to the inverse linear transformation.

As an example, let us consider the diagonal matrix $$D = \begin{pmatrix} \alpha & 0 \\ 0 & \alpha^{-1} \end{pmatrix}$$

in the simple case $\alpha=2$. Here the lattice L is just $2Z \times Z$ (i.e., the set of integer pairs such that the first coordinate is even), and there are two cosets of L in each of the lattices $DZ^2$ and $Z^n$. Hence, there are only two ways to pair off the cosets; the one which gives the smaller error is the one which maps L to (1, 0)+L and (0, ½)+L to L. This yields a bijection $\psi$ with maximum error 1. The formula for the corresponding bijection $\phi$ approximating D is:

$$\varphi\begin{pmatrix} m \\ n \end{pmatrix} = \begin{cases} \begin{pmatrix} 2m+1 \\ n/2 \end{pmatrix} & \text{if } n \text{ is even,} \\ \begin{pmatrix} 2m \\ (n-1)/2 \end{pmatrix} & \text{if } n \text{ is odd.} \end{cases}$$

Note that a greedier algorithm for constructing the bijection might have started by mapping all the points in L to themselves (error 0); but then the points in (0, ½)+L would have to be mapped to (1, 0)+L, leading to a larger overall error of $\sqrt{5}/2$. Also, for this particular example the approximation which is optimal for the forward error also happens to be optimal for the inverse error; there is no reason to believe that this happens in general.

For other rational matrices A, there will probably be more cosets to deal with; in this case, the implementation of a 'periodic' function will probably be by table lookup. To apply the approximating map $\phi$ to a given integer vector x, one will determine which coset $C_k$ of the sublattice $A^{-1}L$ contains x (which is equivalent to determining which coset of L in $AZ^n$ contains Ax), find in the table a corresponding rational vector $a_k$, and let $\phi x = Ax + a_k$. Note that, for a general lattice $A^{-1}L$, determining which coset contains x may not be trivial. It may be more convenient to use a smaller lattice L' $\subseteq A^{-1}L$ of the form $L' = m_1 Z \times m_2 Z \times \ldots \times m_n Z$; this will make the table longer, but will make it much easier to determine which coset contains x. The numbers $m_j$ are easily computed: $m_j$ is the least common denominator of the rational numbers in column j of the matrix A.

Finding the best 'periodic' approximation is a finite combinatorial search problem. There is an algorithm for solving this problem in time polynomial in the number of cosets. Determining whether there is a pairing of source cosets with target cosets meeting a given error bound (and finding one if there is) is a bipartite matching problem which can be solved in polynomial time by network flow methods. The correct optimal bound will be one of the $n^2$ distances between a source coset and a target coset; using a binary search, one can find the optimal bound by solving $\lceil 2 \log_2 n \rceil$ bipartite matching problems.

Of course, if the number of cosets is too large for the optimal 'periodic' approximation to be implemented (let alone found), then one will need to use a different approximation algorithm, even if it is suboptimal.

In order to see how sharp computed upper bounds are, or how close to optimal a given bijection might be, it is useful to obtain lower bounds on the possible supremal errors of integer approximations or lattice bijections. One way to do this (in fact, by the argument of Proposition 6.1, essentially the most general way) is to examine finite parts of the two given lattices and show that one cannot even define a partial bijection on these finite parts without incurring an error of at least $\epsilon$.

One finite configuration is easy to use: if the transformed lattice $AZ^n$ contains a point x which is at distance $\delta$ from the nearest point in the standard lattice $Z^n$, then any bijection from $AZ^n$ to $Z^n$ must have error at least $\delta$. (The same applies if some point in $Z^n$ is at distance at least $\delta$ from the nearest point of $AZ^n$.) In particular, if $AZ^n$ contains points arbitrarily close to the centers of cubes in the standard lattice $Z^n$ (this will be true if, for instance, some column of A has entries $a_{1j}, \ldots, a_{nj}$ such that $a_{1j}, \ldots, a_{nj}$, 1 are linearly independent over the rationals), then the supremal error must be at least $\sqrt{n}/2$.

To obtain better lower bounds, one must analyze the interactions between points in the domain lattice–if $x \neq x'$ and $\psi x = y$, then $\psi x$ cannot also be y, so it may end up being farther from x'. Such analysis is highly dependent on the particular matrix A. In the case of the 2×2 diagonal matrix D, one can substantially improve the lower bound:

Proposition 6.3. If $\alpha>0$ is given, then, for any integer bijection $\phi$ approximating the diagonal matrix D, the error $\sup_{x \in Z^2} \|Dx - \phi x\|$ must be at least $\bar{\epsilon}(\alpha)$, where: if $\alpha>1$ is irrational, then $$\bar{\epsilon}(\alpha) = \sqrt{\left(\frac{1 - (2k-1)\alpha^{-1}}{2}\right)^2 + k^2},$$

where $k = \lceil (\alpha-1)/2 \rceil$; if $\alpha>1$ is a rational number m/n in lowest terms, then $$\bar{\epsilon}(\alpha) = \sqrt{\left(\left\lceil \frac{m - (2k-1)n}{2} \right\rceil / m\right)^2 + k^2},$$

where k is as above; if $\alpha=1$, then $\bar{\epsilon}(\alpha)=0$; if $\alpha<1$, then $\bar{\epsilon}(\alpha) = \bar{\epsilon}(\alpha^{-1})$.

Proof. The case $\alpha=1$ is trivial. Any bound which works for $\alpha$ also works for $\alpha^{-1}$ (because $D(\alpha^{-1})$ is just $D(\alpha)$ with the two coordinates interchanged). So we may assume $\alpha>1$.

Let $\epsilon$ be the supremal error for $\phi$; we must show that $\epsilon \geq \bar{\epsilon}(\alpha)$. Consider the corresponding bijection $\psi = \phi \cdot D^{-1}$ from $DZ^2$ to $DZ^2$, and look at the points of $DZ^2$ on the y-axis.

These points are spaced at a distance $\alpha^{-1}$ apart, which is too crowded; some of them will have to be moved by $\psi$ to points not on the y-axis. (This statement may appear rather vague. To make it more precise, consider a large finite number s. The number of points of $DZ^2$ on the y-axis within distance s of the origin is $2\lfloor s\alpha \rfloor+1$. These points are sent by $\psi$, to points of $Z^2$ within distance $s+\epsilon$ of the origin; since the number of such points on the y-axis is only $2\lfloor s+\epsilon \rfloor+1$, which is smaller than $2\lfloor s\alpha \rfloor+1$ for large s, $\psi$ must map some of these points on the y-axis to points not on the y-axis. The statements in the remainder of this proof can be made precise in the same way, but actually doing so would make the proof far less readable, so we prefer to state the arguments more informally.)

In fact, only a fraction $1/\alpha$ at most of the domain points on the y-axis can be mapped to range points on the y-axis. Similarly, for any other vertical line, $\psi$ maps at most the fraction $1/\alpha$ of the domain points on the y-axis to range points on this vertical line.

The number k was chosen so that $(2k-1)/\alpha<1$. The map $\psi$ sends at most the fraction $(2k-1)/\alpha$ of domain points on the y-axis to range points with x-coordinate of absolute value less than k, because these range points are on $2k-1$ vertical lines. So, for the remaining fraction $1-(2k-1)/\alpha$ of the points on the y-axis, the map $\psi$ introduces an error of at least k horizontally.

If $\alpha$ is irrational, then the vertical distances from points on the y-axis in the domain lattice to the nearest points in the range lattice are spread out uniformly over the interval $[0, \frac{1}{2})$. So, even if we choose the points of least possible vertical error to be given horizontal error at least k, the vertical errors will have to range up to at least $(1-(2k-1)/\alpha)/2$, so the total errors will range up to $\bar{\epsilon}(\alpha)$.

If $\alpha=m/n$ in lowest terms, then $1/m$ of the domain points on the y-axis will entail no vertical error (because they are already standard lattice points), $2/m$ of them will entail vertical error of $1/m$ at least, $2/m$ will entail vertical error at least $2/m$, and so on. If we again try to find the minimum possible vertical errors to combine with the large horizontal errors, we see that we are forced to use vertical errors up to and including $\lfloor (m-(2k-1)n)/2 \rfloor/m$, thus leading to a combined error of $\bar{\epsilon}(\alpha)$.

In particular, for $\alpha=\sqrt{2}$ no integer approximation can have an error bound better than $\sqrt{22-4\sqrt{2}}/4 \approx 1.0106664184619603$; so the approximation obtained from factorization (3.3) is not very far from optimal. And for any $a \neq 1$ the error bound must be at least 1.

There is no reason to expect the lower bound from Proposition 6.3 to be sharp in most cases; examination of lattice points other than those on the one line considered in that proof could show that larger errors must occur.

The proof of Proposition 6.3 applies to any matrix A having a column whose only nonzero entry has absolute value less than 1; a similar argument works to give a lower bound on the error when there is a column whose only nonzero entry has absolute value greater than 1. This can be generalized to other situations where A maps a rational subspace to a rational subspace with the "wrong" scaling.

Additional Considerations

A number of matrix factorization methods for obtaining integer bijections approximating given linear transformations on fixed-length vectors have been considered. Such bijections exist and are easy to implement, and can be made to have additional desirable properties, such as preservation of suitable integer inputs (which are preserved by the given transformation). Approximation methods that are not based on simple matrix factorizations were also considered.

There are many possibilities that remain to be explored, including additional factorizations of matrices, different integer approximations of matrix factors, more integer approximation methods having nothing to do with factorizations, and improved error analysis.

For instance, as noted earlier, unit triangular matrices can produce larger error bounds for the inverse transform than for the forward transform, because the inverse transform is computed recursively. One might be able to compute the transform in a different way, perhaps doing the recursion in the forward transform for some factors and in the inverse transform for other factors, so as to balance out the errors. Or one could try to use a different sort of factor matrix which does not have this problem. For instance, suppose we partition the coordinates or bands into two groups, and consider two kinds of factors: one where linear combinations of first-group coordinates are added to second-group coordinates, and one where linear combinations of second-group coordinates are added to first-group coordinates. Then recursion would not be needed to invert any of these factor matrices, and one may be able to get better overall error bounds. On the other hand, degree-of-freedom counting shows that such factorizations would require at least four factors in the general fixed-length case, if the length is greater than 2; and more detailed analysis shows that even four factors is not enough. It is likely that the additional factors will outweigh the benefit from eliminating recursion in the inverse.

As for the error analysis, even the simple case of a 2×2 diagonal matrix was not analyzed completely. In more complicated cases the analysis was quite selective; many variant factorizations remain to be examined. And everything was based on the initial assumption that the goal was to minimize the worst-case error in the integer approximation of the transform (and perhaps the inverse transform). Some applications may entail optimizing with respect to some other parameter, in which case different integer approximations may work better.

Unbounded Length Vectors

As discussed earlier, the second version of the problem involves analyzing input vectors for signals having unbounded length (number of coordinates), but which are of bounded amplitude (i.e., the values appearing as coordinates of the vector are bounded). Such signals are treated as bounded sequences of real numbers that are essentially infinite in both directions. In practice, however, the signals will be of finite length and boundary conditions will be needed at the ends of these sequences.

The use of infinite sequences of real numbers imposes two restrictions. The first restriction is a time-invariance condition. Strict time invariance or shift invariance would require that shifting the input signal over by one step would result in the same output signal also shifted over by one step. This is too strong, though; instead we require that the coordinates of the output signal be obtained by applying n time-invariant transformations in rotation (so shifting the input n steps results in the same output shifted by n steps). This can also be expressed as applying n time-invariant mappings or "filters," taking only every n'th coordinate of each output signal ("downsampling"), and merging the results.

In such a case the output signal consists of n different subsignals or "bands" merged together. One can also treat the input signal as comprising n bands in the same way. So the input signal is conceptually broken up into blocks of length n; the j'th band consists of the j'th component of each block. (Sometimes the input signal is presented in n separate bands already.) So the input and output signals can be thought of as essentially infinite sequences of members of $R^n$, and the linear transformation as a fully time-invariant mapping in this formulation.

The second restriction is that a component of the output signal depends on only finitely many components of the input signal; a transformation with this property is called FIR (finite impulse response). A time-invariant (or n-fold time-invariant as above) FIR linear transformation must produce a bounded-amplitude output signal when applied to a bounded-amplitude input signal. The part of the input signal on which a given output coordinate depends (the "stencil" of the transformation) will often include more than n coordinates.

A linear transformation with these properties can be described by n×n matrices $M_k$ for $k \in Z$, only finitely many of which are nonzero. The input signal x is a sequence of n-vectors $x_i$, and the output signal y=f(x) is a sequence of n-vectors $y_j$; these are related by the formula $$y_j = \sum_k M_k x_{j+k} = \sum_i M_{i-j} x_i$$

(the sums are over all integers, but only finitely many terms are nonzero). This can be more conveniently expressed in terms of the z-transform, which we think of here as a generating function approach. If we introduce the generating functions $p(z)=\Sigma_i x_i z^i$ and $q(z)=\Sigma_j y_j z^j$ for the input and output signals (these can be thought of as series of n-vectors or as n-vectors of series), and we also define the matrix $A(z)$ to be $\Sigma_k M_k z^{-k}$, then the formula above becomes simply $q(z)=A(z)p(z)$. The z-transform matrix $A(z)$ (commonly called the polyphase matrix of the transformation) is a matrix whose entries are Laurent polynomials over R, i.e., members of the ring $R[z, z^{-1}]$. If no negative powers of z occur in the matrix, then the output vector at time j depends only on the input vectors at time j and earlier times (the transformation is causal). Just as for fixed-length transformations, composition of transformations here corresponds to multiplication of the associated z-transform matrices.

We will assume that the given linear transformation is invertible and that the inverse transformation is also FIR (it is automatically linear and time-invariant). In this case, the original transformation is said to admit perfect reconstruction. So the inverse transformation is also given by a z-transform matrix $B(z)$, and if $p(z)$ and $q(z)$ are as above, then we have $p(z)=B(z)q(z)=B(z)A(z)p(z)$. Since this holds for all input signals, $B(z)$ must be the inverse matrix to $A(z)$.

We will require our integer approximation maps to be FIR and time-invariant (on n-vectors), but not necessarily linear. And we impose the same restrictions on the inverse maps.

In order to measure the error of an integer approximation, we need a norm on the space of signals; the Euclidean norm does not apply to infinite-length signals. Since we are working with bounded-amplitude signals, we could simply take the supremum of the absolute values of the components of the signal. But since we are thinking of the signal y as a sequence of vectors $y_j \in R^n$, it is natural to define the norm $\|y\|$ to be $\sup_j \|y_j\|$. Then the error of an integer approximation $\phi$ to a given linear transformation A is just the supremum of $\|Ax-\phi x\|$ over all input signals x. (We will abuse notation slightly by using A for a transformation and $A(z)$ for its z-transform matrix.)

Invertible Integer-to-Integer Signal Mappings

As we discussed earlier, in the fixed-length case, a necessary condition for the existence of a bounded-error integer approximation $\phi$ to the linear transformation A is that det $A=\pm 1$. We may as well assume that the determinant is 1, because, if it is −1, we can negate a row of the matrix to change the determinant to +1.

In the unbounded-length case, the linear transformation is given by a matrix $A(z)$ over $R[z, z^{-1}]$. We are assuming that the inverse transformation is also given by such a matrix, which must be the inverse of $A(z)$, so det A must be an invertible element of the ring $R[z, z^{-1}]$, i.e., a nonzero monomial $cz^k$.

If we look at an integer input signal that is constant on each band, then the output Signal will also be constant on each band; this essentially reduces to the case of vectors of fixed length n. The constant matrix for this fixed-length transformation is just $A(1)$. Since an integer approximation for general signals certainly gives an integer approximation for these particular signals, the matrix $A(1)$ must satisfy the necessary condition above, det $A(1)=\pm 1$. So the monomial det $A(z)$ must be $\pm z^k$ for some integer k. Again we can pull this factor out of one of the bands to reduce to the case of a transformation of determinant 1; an integer approximation for the modified matrix easily yields one for the original matrix Oust shift and/or negate one band at the end).

As described earlier, the main approach will be to factor a given z-transform matrix into matrices of special form, mainly 'permutation' matrices (ordinary permutation matrices with some entries negated) and elementary matrices. The 'permutation' matrices are easy to handle, because they already map integer signals to integer signals (they just rearrange and possibly negate the bands).

An elementary matrix factor (differing from the identity only at a single off-diagonal entry) corresponds to a transformation which adds a multiple of one band (or, if the off-diagonal entry has several terms, multiples of shifted copies of one band) to another band. Factorizations into such matrices have been considered by a number of those skilled in art, such factors, at least in the 2×2 case, are also known as liftings.

If a transformation is given by an elementary matrix which adds some modification (combination of shifts and constant multiples) of band i to band j, then we get an integer-to-integer approximation to the transformation by simply rounding the modification of band i to an integer before adding it to band j. This is easily invertible: simply subtract the same rounded modification of band i from band j. This applies more generally to matrices given by unit triangular matrices (lower or upper triangular matrices whose diagonal entries are all 1).

A number of the calculations presented earlier can be applied without change in the present context, given suitable definitions. In particular, we define the norm $\|A\|$ of a signal transformation A (or the norm $\|A(z)\|$ of its associated z-transform matrix) to be the supremum of $\|Ax\|/\|x\|$ over all nonzero bounded inputs x (where $\|x\|$ is defined as in the preceding section). Then, if $A=A_1 A_2 \ldots A_k$ where each $A_i$ can be approximated by an integer mapping $\phi_i$ with error bound $C_i$, then A can be approximated by the composition of these integer mappings with error bound $$C_1+\|A_1\|C_2+\|A_1\|\|A_2\|C_3+ \ldots +\|A_1\|\|A_2\| \ldots \|A_{k-1}\|C_k. \quad (9.1)$$

In fact, this bound can be slightly improved to:

$$C_1+\|A_1\|C_2+\|A_1A_2\|C_3+ \ldots +\|A_1A_2 \ldots A_{k-1}\|C_k. \quad (9.2)$$

Also, if $\phi$ approximates A, then $\phi^{-1}$ approximates $A^{-1}$, because if $x=\phi^{-1}y$, then $$\|A\|^{-1}\|Ax-\phi x\| \leq \|A^{-1}y\| \leq \|A^{-1}\|\|Ax-\phi x\|. \quad (9.3)$$

In this section, we will concentrate on one-dimensional signals, but the methods are also applicable to multidimensional signal transformations (i.e., to matrices whose entries are Laurent polynomials in several variables rather than the single variable z). In particular, elementary matrices are approximable by integer bijections as above even in the multidimensional case. The main difference is that it is more difficult if not impossible to factor a given multidimensional matrix of determinant 1 into elementary matrices.

Factoring a z-Transform Matrix

The Gaussian elimination method for factoring a matrix over R into elementary matrices and a diagonal matrix (and maybe a permutation matrix as well) can be extended to the case of matrices over $R[z, z^{-1}]$. This is the Laurent polynomial version of the algorithm for reducing a matrix polynomial to Smith normal form. The Smith normal form and a variety of methods for reducing a matrix polynomial to Smith normal form are known by those of ordinary skill in this field, where such methods involve, for instance, a Laurent polynomial case for 2×2 matrices and a case for n×n matrices.

Here we are concerned with the perfect reconstruction case, so we assume that the determinant of the given matrix A(z) is a nonzero monomial. In fact, by pulling out a diagonal matrix factor to begin with, we can reduce to the case where det A(z)=1. The entries in such a diagonal matrix represent scaling (the numerical coefficients) and delays or advances (the powers of z) for the corresponding bands.

The main part of the algorithm uses elementary row operations (each of which corresponds to pulling out an elementary matrix factor on the left). Start by selecting a column to reduce (say, the first column). If this column has more than one nonzero entry, then choose two nonzero entries, say a(z) and b(z). Suppose that the 'degree' of a(z) is at least as large as the 'degree' of b(z). (Here we define the 'degree' of a Laurent polynomial to be the degree of the highest-degree term minus the degree of the lowest-degree term; the 'degree' of 0 is $-\infty$.) Then we can perform an elementary row operation which subtracts a suitable multiple of b(z) from a(z) so that the difference has lower 'degree' than a(z). (One can actually choose the multiple so that the difference has lower 'degree' than b(z). However, it will be useful later to not require this, even if it means that more reduction steps are needed.) Repeat this process until all but one of the entries in the selected column are 0. Since det A(z) has 'degree' 0, the remaining nonzero entry must be a nonzero monomial.

Now select a second column, and do the same reduction to all of the entries in this column except the one in the row containing the nonzero entry from the first column (this row is excluded for now). So only one such entry will be nonzero, and again this entry must be a nonzero monomial.

This means that, with one more row operation, we can zero out the entry in the excluded row in the second column. Do the same thing in a third column (now there are two excluded rows), and so on until all columns are processed. What remains will be a permuted diagonal matrix, with the nonzero entries being monomials with product 1.

After pulling out a permutation matrix (or a 'permutation' matrix of determinant 1), we are left with a diagonal matrix of determinant 1. This can be written as a product of diagonal matrices each of which has only two non-1 diagonal entries, which are reciprocals of each other. Then, if desired, one can write each of these essentially 2×2 diagonal matrices as a product of elementary matrices using the formulas discussed previously. In fact, if one really wants to, one can even write the 'permutation' matrix of determinant 1 as such a product as well, because such a 'permutation' can be written as a product of simple 'permutations' each of which just swaps two rows and negates one of them, and such a simple 'permutation' can be written as a product of three elementary matrices:

$$\begin{pmatrix} 0 & -1 \\ 1 & 0 \end{pmatrix} = \begin{pmatrix} 1 & 0 \\ 1 & 1 \end{pmatrix}\begin{pmatrix} 1 & -1 \\ 0 & 1 \end{pmatrix}\begin{pmatrix} 1 & 0 \\ 1 & 1 \end{pmatrix} \quad (10.1)$$

If one factors all the way down to elementary matrices in this way (leaving the 'permutation' matrix unfactored), then a great many factors might be required. But it turns out that unit triangular matrices are as good for our purposes as elementary matrices (simple rounding works as an integer approximation method, as discussed previously); using these, one can get by with far fewer factors, because one permuted unit triangular matrix can replace a large number (up to n(n−1)/2 of elementary matrices. To see this, suppose we are in the process of reducing a column. Say $p_1(z)$ is the nonzero entry in this column of lowest 'degree'; use elementary row operations to subtract multiples of $p_1(z)$ from the other nonzero entries to get their 'degrees' below that of $p_1(z)$. Let $p_2(z)$ be the newly modified entry of least 'degree,' and subtract multiples of $p_2(z)$ from the other nonzero entries (excluding $p_1(z)$) to reduce their 'degrees' below that of $p_2(z)$. Now choose $p_3(z)$ and reduce the other nonzero entries, excluding $p_1(z)$ and $p_2(z)$; and so on. All of the reduction steps described here can be combined into a single permuted unit triangular matrix.

However, there is no fixed bound (depending on n alone) for the number of factors needed here, even if these more general factors are allowed; if the entries of the matrix have very high 'degree,' then many factors might be required.

If one is interested in factoring a causal linear transformation (one where no negative powers of z occur in the corresponding matrix) into causal elementary factors, one can do so by following the same procedure as above, using ordinary polynomial degrees instead of 'degrees'. This is just the ordinary reduction of a polynomial matrix to Smith normal form. In this case, if the determinant of the matrix has one or more factors z, one may not be able to remove them at the beginning; instead one follows the Smith normal form process (which is slightly more involved in this case) and ends up with a diagonal matrix in the middle of the factorization. If this diagonal matrix has determinant $\pm z^k$, then one can express it as a constant diagonal matrix of determinant 1 (which can be factored into elementary matrices, as discussed earlier) and a diagonal matrix with entries of the form $\pm z^j$ (which must be handled some other way).

Factors which Preserve Constant Signals

As described earlier, one can consider the case where the given linear transformation already sends certain integer-valued inputs to integer-valued outputs, and we want the integer-to-integer approximating map to give the same results for these inputs.

In particular, let us consider the constant input signal with value k on all coordinates. Most filter banks are set up with one low-pass filter and one or more higher-pass filters. The higher-pass filters should have zero response to a constant signal, while the low-pass filter should give a constant nonzero response (preferably the same constant as the input). If the low-pass filter appears first in the bank, then the above properties can be expressed in terms of the z-transform matrix $M(z)$ for the filter bank by the equation $M(1)1=e_1$, where 1 is the vector in $R^n$ with all coordinates 1 and $e_1$ is the vector with first coordinate 1 and remaining coordinates 0.

We also consider the closely related family of matrices $A(z)$ such that $A(1)e_1=e_1$. Such a matrix, when applied to an input consisting of a constant signal on band 1 and zero on all other bands, returns that input unchanged. (Such a matrix would commonly occur for a processing step applied to a signal after it had already been separated into low-frequency and high-frequency bands.) One can convert from a matrix $M(z)$ satisfying $M(1)1=e_1$ to the form $A(z)$ by pulling out a constant matrix factor $\Delta$ which sends 1 to $e_1$ as described earlier: if $M(z)=A(z)\Delta$, then $M(1)=A(1)\Delta$, so $M(1)1=e_1$ if and only if $A(1)e_1=e_1$.

The condition $A(1)e_1=e_1$ is equivalent to the statement that the leftmost column of $A(1)$ is $e_1$. This means that, in the matrix $A(z)$, all entries in the first column are divisible by $z-1$ except for the first entry, which has remainder 1 when divided by $z-1$.

Let G be the set of all matrices $A(z)$ with entries from $R[z, z^{-1}]$ which have determinant 1 and satisfy the equation $A(1)e_1=e_1$. It is easy to see that G is a group. The set of matrices $M(z)$ of determinant 1 which satisfy $M(1)1=e_1$ is the right coset $G\Delta$ of G.

If we have an elementary matrix in G, then its standard integer approximation also leaves a constant integer signal in band 1 (with zeros elsewhere) unchanged. So any matrix which can be factored into elementary matrices in G has an integer approximation which preserves constant signals in band 1.

Theorem 11.1. Any matrix in the group G can be factored into a product of elementary matrices in G.

Proof. We perform the same reduction using elementary row operations as in the previous section, but with an extra restriction on the operations. When we have two nonzero entries $a(z)$ and $b(z)$ in the column we are currently working on, we wish to perform an elementary row operation which either subtracts a multiple of $a(z)$ from $b(z)$ so as to reduce its 'degree,' or subtracts a multiple of $b(z)$ from $a(z)$ so as to reduce its 'degree.' For an elementary row operation to correspond to a matrix in G, it must meet the following restriction: if it subtracts a multiple of row 1 from another row, then the multiplier must be divisible by $z-1$.

If neither $a(z)$ nor $b(z)$ is in row 1, then the restriction does not apply, and the usual reduction step is allowed. Now say $a(z)$ is in row 1. If the 'degree' of $a(z)$ is greater than or equal to that of $b(z)$, then we can subtract a suitable multiple of $b(z)$ from $a(z)$; again this is always allowed. If the 'degree' of $a(z)$ is less than that of $b(z)$, then we want to subtract a multiple of $a(z)$ from $b(z)$ so as to eliminate at least one leading or trailing coefficient from $b(z)$. (We are not requiring that the 'degree' of $b(z)$ be reduced all the way below that of $a(z)$; reducing it by at least one will suffice.) So in fact we could make the multiplier a monomial $cz^k$ chosen so that the leading term of $cz^k a(z)$ is the same as that of $b(z)$. But the multiplier $cz^k - cz^{k-1}$ would also work to eliminate the leading term of $b(z)$, and it would not introduce new trailing terms because the 'degree' of $cz^{k-1}(z-1)a(z)$ is one more than that of $a(z)$, and hence not more than that of $b(z)$. So this multiplier will give a valid reduction step, while satisfying the G restriction.

Let us require that column 1 be the first column reduced in this way. After column 1 is reduced, the remaining nonzero entry in this column must be in row 1, because the matrix will still be in G. Then one can proceed to reduce the other columns as described in the previous section; these row operations do not involve row 1, so they are all allowed. And the steps for eliminating the remaining entries in excluded rows never require subtracting a multiple of row 1 from another row (since row 1 was the first row excluded), so they are allowed as well.

So we can reduce to a permuted diagonal matrix. Since the upper left entry of the matrix is still nonzero, the permutation does not move index 1. So one can perform a sequence of swap-and-negate operations not involving row 1 so as to reduce to an actual diagonal matrix; these operations can be expressed as elementary operations using (10.1), and these operations are allowed because they do not involve row 1.

We are now left with a diagonal matrix of determinant 1 whose entries are monomials in z; and the monomial in the upper left corner must have coefficient 1 in order for the matrix to be in G. This matrix can be factored into essentially 2×2 diagonal factors of the form considered earlier, where each diagonal entry is a monomial in z: one between rows 1 and 2, one between rows 2 and 3, and so on. Each of these factors can be broken down into elementary matrices using the formula $$\begin{pmatrix} \alpha & 0 \\ 0 & \alpha^{-1} \end{pmatrix} = \begin{pmatrix} 1 & 1 \\ 0 & 1 \end{pmatrix}\begin{pmatrix} 1 & 0 \\ \alpha-1 & 1 \end{pmatrix}\begin{pmatrix} 1 & -\alpha^{-1} \\ 0 & 1 \end{pmatrix}\begin{pmatrix} 1 & 0 \\ -(\alpha-1)\alpha & 1 \end{pmatrix}$$

(this is (2.1) with $r=1$ and $s=\alpha-1$). For the first factor, $\alpha$ is of the form $z^k$, so $\alpha-1$ and $(\alpha-1)\alpha$ are divisible by $z-1$; thus, the elementary matrices here are in G. For the remaining factors the restriction does not apply. This completes the factorization into elementary matrices in G.

As in the preceding section, one can get by with far fewer factors by using unit triangular matrices rather than elementary matrices in the n×n case.

Again, if one has a causal transformation of determinant 1 and wants causal elementary factors, one can get them by the same procedure, using ordinary polynomial degrees instead of 'degrees' and always trying to eliminate leading coefficients rather than "leading or trailing" coefficients. (The entries in the final diagonal matrix will be constants.) So any causal matrix in G can be factored into causal elementary matrices in G.

For a causal transformation whose determinant has z factors, one can first check whether the first column of the matrix is divisible by a power of z; if so, this power can be pulled out as a diagonal matrix on the right (which just shifts band 1, and hence preserves a constant signal in this band). Once this is done, the first column can be reduced as usual, and then the Smith normal form process can be applied to the lower right (n−1)×(n−1) submatrix. Then a diagonal matrix can be pulled out on the left (in two parts, as at the end of the preceding section), and the reduction of row 1 using the remaining rows (which now look like the identity matrix) can be completed.

In the proof of Theorem 11.1, the first row and column of the matrix must be handled specially, but there is no restriction on the remaining rows and columns; they can be reduced by any Euclidean algorithm steps desired. This extra freedom can be used to obtain additional properties of the factorization, if desired.

For instance, suppose k<n is fixed, and we are given an n×n matrix A(z) over R[z, z$^{-1}$] of determinant 1 with the property that A(1)e$_1$=e$_1$ for all i≦k, where e$_i$ is a vector with 1 in entry i and 0 elsewhere. In other words, the transformation given by A(z) preserves a single-band constant signal in any of the first k bands. Then A(z) can be factored into elementary matrices which also preserve constant signals in these bands. To see this, first perform the reduction on the first column as in the proof of Theorem 11.1, where now the first k rows are restricted (any elementary operation with one of these rows as the source must use a multiplier divisible by z−1). We can continue this until no more legal reductions are possible; at this point all of the unrestricted rows will have been zeroed out. Since the determinant of the matrix is 1, the remaining nonzero entries in the column must have greatest common divisor 1, so we can obtain the number 1 as a sum of multiples (by elements of R[z, z$^{-1}$]) of these entries. Using the same multipliers with an additional factor of z−1, we can perform legal elementary operations so as to make the entry in row n of this column equal to z−1. Now, since the first entry in this column is 1 plus a multiple of z−1 (this was true at the start, and all operations preserved it), we can perform one more elementary operation from row n to row 1 to change this first entry to 1. Now legal elementary operations from row 1 can be used to zero out all of the other entries (which are multiples of z−1). Next we proceed to the second column and do the same thing in rows 2 through n; then we can easily eliminate entry 1 in this row using the 1 in entry 2. Proceed this way through the first k columns, and then use the unrestricted algorithm to handle the rest.

Small-Stencil Factorizations

When we factor a z-transform matrix into elementary matrices, we are decomposing the corresponding transformation into steps which allow only a very specific form of interaction between parts of the signal. However, this form of interaction can still be very wide-ranging, because arbitrary powers of z are allowed in the multipliers occurring in the elementary factors. One may want to restrict the factors further so as to require the interactions to be fairly local.

Let us consider the case of 2×2 matrices first. This is the case where the signal (long sequence of numerical values) is broken up into two-entry blocks. An elementary matrix factor with nonzero entry in the upper right corner will modify this signal by leaving the second entries in the blocks alone, but adding some linear combination of the second entries to the first entries. If the nonzero entry is in the lower left corner, then a linear combination of the first entries will be added to the second entries.

A natural locality restriction would be to require that the number added to a second entry be computed from the two neighboring first entries (the one in the same block and the one in the next block), and the number added to a first entry be computed from the two neighboring second entries (the one in the same block and the one in the previous block). This means that we allow only elementary matrix factors of the forms $$\begin{pmatrix} 1 & rz+s \\ 0 & 1 \end{pmatrix} \text{ and } \begin{pmatrix} 1 & 0 \\ rz^{-1}+s & 1 \end{pmatrix},$$

where r and s are constants.

For n×n matrices where n>2, it is less obvious what the exact meaning of "small-stencil" or "local" elementary matrix should be. One could allow only nearest-neighbor interactions as in the 2×2 case, but this would be extremely restrictive; it would allow only elementary matrices where the nonzero off-diagonal entry is a constant adjacent to the diagonal, a monomial rz in the upper right corner, or a monomial rz$^{-1}$ in the lower left corner. It would be more flexible to allow interactions between the i'th entry in a block and the two closest j'th entries, one on each side. This would allow the nonzero off-diagonal entry of the elementary matrix to occur anywhere, but: if it is above the diagonal, it must be of the form rz+s; if it is below the diagonal, it must be of the form rz$^{-1}$+s . (Or one may want a different definition here if one is trying to meet particular implementation restrictions.)

It turns out that, even with the restrictive nearest-neighbor definition, it is always possible to factor a z-transform matrix of determinant 1 into small-stencil elementary factors. Since we already know how to factor such a matrix into unrestricted elementary factors, we just need to express a given elementary matrix as a product of small-stencil elementary matrices. Next note that, because of equations such as $$\begin{pmatrix} 1 & a+b \\ 0 & 1 \end{pmatrix} = \begin{pmatrix} 1 & a \\ 0 & 1 \end{pmatrix}\begin{pmatrix} 1 & b \\ 0 & 1 \end{pmatrix}, \quad (12.1)$$

we may assume that the nonzero off-diagonal entry in the given elementary matrix is a monomial.

In terms of the unblocked signal, this transformation adds c times entry number i+kn to entry number j+kn for all integers k, where c, i, and j are given constants (and j−i is not divisible by n). If this is not already a nearest-neighbor interaction (i.e., |j−i|>1), then it can be changed into one by using nearest-neighbor swaps to move the interacting entries closer to each other. For instance, if j−i>1, then we can swap entry j−1+kn with entry j+kn for all integers k. This will not move the entries in positions i+kn unless j−1−i is divisible by n, in which case these entries are moved one place to the right. So the interacting entries will end up one or two places closer to each other. Repeat this until the interacting entries are adjacent, do the operation which performs the interaction, and then reverse all the swaps. This factors the nonlocal operation into a sequence of local operations (including swaps).

We do not want to use literal swaps, though, since they have determinant −1 as linear operations. Instead, we negate one of the two entries being swapped; this 'swap' or swap-and-negate is a 90-degree rotation between two bands.

Returning to the z-transform matrices, this states that we can factor our non-local monomial elementary matrix into a local monomial elementary matrix and a number of local 'swaps.' A local 'swap' which does not cross block boundaries looks like an identity matrix except that some 2×2 block centered on the diagonal is changed to $$\begin{pmatrix} 0 & 1 \\ -1 & 0 \end{pmatrix} \text{ or } \begin{pmatrix} 0 & -1 \\ 1 & 0 \end{pmatrix}.$$

If the 'swap' does cross a block boundary, then it is an identity matrix with the four corner entries changed to $$\begin{pmatrix} 0 & z \\ -z^{-1} & 0 \end{pmatrix} \text{ or } \begin{pmatrix} 0 & -z \\ z^{-1} & 0 \end{pmatrix}.$$

Here is an example with n=3:

$$\begin{pmatrix} 1 & 0 & 0 \\ 0 & 1 & 0 \\ 7z & 0 & 1 \end{pmatrix} = \begin{pmatrix} 1 & 0 & 0 \\ 0 & 0 & -1 \\ 0 & 1 & 0 \end{pmatrix} \begin{pmatrix} 0 & -1 & 0 \\ 1 & 0 & 0 \\ 0 & 0 & 1 \end{pmatrix} \begin{pmatrix} 0 & 0 & z \\ 0 & 1 & 0 \\ -z^{-1} & 0 & 0 \end{pmatrix} \times$$

$$\begin{pmatrix} 1 & 0 & 0 \\ 0 & 1 & 0 \\ 0 & -7 & 1 \end{pmatrix} \begin{pmatrix} 0 & 0 & -z \\ 0 & 1 & 0 \\ z^{-1} & 0 & 0 \end{pmatrix} \begin{pmatrix} 0 & 1 & 0 \\ -1 & 0 & 0 \\ 0 & 0 & 1 \end{pmatrix} \begin{pmatrix} 1 & 0 & 0 \\ 0 & 0 & 1 \\ 0 & -1 & 0 \end{pmatrix}$$

It now remains to note that each local 'swap' can be factored into three local elementary matrices. For the case where the 'swap' does not cross a block boundary we just use (10.1). If the 'swap' does cross a block boundary we use a very similar formula:

$$\begin{pmatrix} 0 & -z \\ z^{-1} & 0 \end{pmatrix} = \begin{pmatrix} 1 & 0 \\ z^{-1} & 1 \end{pmatrix} \begin{pmatrix} 1 & -z \\ 0 & 1 \end{pmatrix} \begin{pmatrix} 1 & 0 \\ z^{-1} & 1 \end{pmatrix}.$$

In, summary, we have:

Proposition 12.1. Any matrix over R[z, z$^{-1}$] of determinant 1 can be factored into small-stencil elementary matrices.

This holds under either definition of "small-stencil." Note that a large number of factors may be required.

If a given z-transform matrix has determinant a monomial other than 1, then of course it cannot be factored into small-stencil elementary factors, because it cannot be factored into elementary factors at all. But if we allow a simple one-step shift and/or negation in one band (i.e., the identity matrix with one diagonal entry changed to $\pm z^{\pm 1}$ or $-1$) to be considered "small-stencil," then a factorization into small-stencil factors can be achieved. To see this, recall from previous sections that one can factor the given matrix into elementary matrices and diagonal matrices with diagonal entries of the form $\pm z^k$; the elementary parts are handled as above, and the diagonal parts are taken care of by these new factors. Similar remarks apply in the next two sections.

Simultaneous Small-Stencil and Constant-Preserving Factors

In the preceding two sections we considered two extra properties that can be achieved in a factorization of a suitable z-transform matrix. Is it possible to achieve both of these properties at the same time?

First consider the more flexible definition of "small-stencil" from the previous section; we will see that suitable factorizations do exist in this case. Suppose we are given a matrix in the group G. We can factor the given matrix into elementary matrices in G using the methods discussed in the section entitled "Factors Which Preserve Constant Signals"; some of these have the nonzero off-diagonal entry in the first column, and others do not. For the ones which do not, the off-diagonal entry is unrestricted; we may assume that the off-diagonal entry is a monomial because of (12.1). This matrix can now be factored into a local elementary matrix and some local 'swaps' using the method described in the previous section.

For the elementary matrices with off-diagonal entry in the first column, we are not allowed to reduce to the case of monomials; instead, using (12.1), we can reduce to the case where the off-diagonal entry has the form $c(z^k - z^{k-1})$ for some real constant c and some integer k. This means that c times an entry in the source band is added to an entry in the destination band and subtracted from the next entry in the destination band. By performing a suitable sequence of 'swaps,' one can arrange for each source entry to lie in between the two destination entries it will affect. Then the desired operation will be small-stencil under the flexible definition. Afterwards the 'swaps' can be reversed to restore the bands to their original positions.

The factors here are not in the group G; instead of leaving the constant signal alone on the first band, they move it around from band to band. But the elementary operations specified above do leave the constant signal unchanged on whatever band it is currently in when the operations are applied. As for the 'swaps,' when one of these is factored into three elementary steps, the constant signal may appear on two bands simultaneously, but it will be restored to a single band (although perhaps negated) by the time the 'swap' is complete. So the corresponding integer approximation maps will always leave this integer constant signal unaltered (somewhere), and when all of the factors have been performed the constant signal will end up where it started, unchanged by the integer approximation map.

Now suppose we want to use the restrictive nearest-neighbor definition of "small-stencil." Here we assume $n \geq 3$, because the case n=2 is already handled above. The same procedure described above works here, except that the elementary operation adding the band containing the constant signal to another band (multiplied by c in one direction and by -c in the other direction) is no longer allowed and must be decomposed further.

Suppose that the band currently containing the constant signal is band i, and we want to add it to band j: for each entry x in band i, we are to add cx to the nearest entry to the right in band j and subtract cx from the nearest entry to the left in band j. Let j' be a band adjacent to j which is not band i. Now perform the following procedure:

subtract c times band j' from band j;
move band i up to band j'−1;
add band j'−1 to band j';
move band j'−1 down to band j'+1;
subtract band j'+1 from band j';
move band j'+1 up to band i;
add c times band j' to band j;
move band i up to band j'−1;
subtract band j'−1 from band j';
move band j'−1 down to band j'+1;
add band j'+1 to band j';
move band j'+1 up to band i.

Each "add" or "subtract" here is a nearest-neighbor elementary operation. "Move band i up to band j'−1" means that, if band i is not already immediately below band j' (if it is, do nothing), then 'swap' band i with band i+1 (the band moving from i+1 to i is the one which is negated), then 'swap' band i+1 with band i+2, and so on, wrapping around from n to 1 if necessary, until the band being moved reaches j'−1 (or n if j'=1). The other "move" steps are interpreted similarly. Each of these 'swaps' is factored into three nearest-neighbor elementary operations as usual.

One can check that the net effect of this procedure is as desired: for each entry x in band i, the procedure adds cx to the nearest entry to the right in band j and subtracts cx from the nearest entry to the left in band j. When it is applied to input containing a constant signal in band i and nothing elsewhere, the "subtract c times" operation has no effect, the next five steps add the constant signal to band j' and then subtract it from band j' for no net effect, the "add c times" step does nothing because there is nothing currently in band j', and the last five steps again subtract and add the same signal from band j' for no net effect. So this procedure preserves the constant signal in band i.

Thus, even under the strictest definition of "small-stencil," one can find a factorization of a given matrix in G into elementary factors so that the resulting integer approximation map $\phi$ preserves a constant signal in band 1.

But suppose one does not want the constant signal to roam from one band to another in this way. Is it still possible to achieve a small-stencil and constant-preserving factorization? In other words, can every matrix in the group G be factored into small-stencil elementary factors which are also in the group G?

The answer to this also turns out to be yes, if the flexible definition of "small-stencil" is used. Let us first consider the 2×2 case. We can factor the given matrix into elementary matrices in G as before. Again as before, we can reduce to the case where the nonzero off-diagonal entry of an elementary matrix is a monomial if it is not in column 1, and is of the form $c(z^k - z^{k-1})$ if it is in column 1.

If an elementary matrix has as its nonzero entry a monomial at the upper right, we can handle it using the factorization $$\begin{pmatrix} 1 & cz^{2k+i} \\ 0 & 1 \end{pmatrix} = \begin{pmatrix} z & 0 \\ 0 & z^{-1} \end{pmatrix}^k \begin{pmatrix} 1 & cz^i \\ 0 & 1 \end{pmatrix} \begin{pmatrix} z & 0 \\ 0 & z^{-1} \end{pmatrix}^{-k},$$

where k is an integer and i is 0 or 1. The elementary matrix appearing on the right here is small-stencil, and the z-shift diagonal matrix has the following small-stencil factorization in G:

$$\begin{pmatrix} z & 0 \\ 0 & z^{-1} \end{pmatrix} = \begin{pmatrix} 1 & 0 \\ 1 & 1 \end{pmatrix} \begin{pmatrix} 1 & z^{-1}-1 \\ 0 & 1 \end{pmatrix} \begin{pmatrix} 1 & 0 \\ -\frac{1}{2}z & 1 \end{pmatrix} \times$$

$$\begin{pmatrix} 1 & 2-2z^{-1} \\ 0 & 1 \end{pmatrix} \begin{pmatrix} 1 & 0 \\ \frac{1}{2} & 1 \end{pmatrix} \begin{pmatrix} 1 & z^{-1}-1 \\ 0 & 1 \end{pmatrix} \begin{pmatrix} 1 & 0 \\ -z & 1 \end{pmatrix}$$

The other elementary matrix, with a binomial at the lower left, is handled by the factorization $$\begin{pmatrix} 1 & 0 \\ c(z^{2k+i} - z^{2k+i-1}) & 1 \end{pmatrix} = \begin{pmatrix} z & 0 \\ 0 & z^{-1} \end{pmatrix}^{-k} \begin{pmatrix} 1 & 0 \\ cz^i(1-z^{-1}) & 1 \end{pmatrix} \begin{pmatrix} z & 0 \\ 0 & z^{-1} \end{pmatrix}^{k}.$$

The elementary matrix on the right here is small-stencil if i=0. If i=1, we need to factor it further:

$$\begin{pmatrix} 1 & 0 \\ c(z-1) & 1 \end{pmatrix} = \begin{pmatrix} 1 & c^{-1} \\ 0 & 1 \end{pmatrix} \begin{pmatrix} 1 & 0 \\ cz^{-1}-c & 1 \end{pmatrix} \times$$

$$\begin{pmatrix} 1 & -\frac{1}{2}c^{-1}z \\ 0 & 1 \end{pmatrix} \begin{pmatrix} 1 & 0 \\ 2c-2cz^{-1} & 1 \end{pmatrix} \begin{pmatrix} 1 & -\frac{1}{2}c^{-1} \\ 0 & 1 \end{pmatrix}$$

This completes the factorization into small-stencil elementary matrices in G.

For the n×n case, first factor the matrix into elementary matrices in G as in the previous section entitled "Factors Which Preserve Constant Signals." Each of these elementary matrices only affects two of the n bands, so it can be factored into local elementary matrices by the methods for the 2×2 case above; under the more flexible definition, these factors are small-stencil.

If the strict nearest-neighbor definition of "small-stencil" is used, then there are n×n matrices in G for n≧3 which cannot be factored into small-stencil elementary factors in G. In fact, a small-stencil elementary factor in G cannot have its nonzero off-diagonal entry in the first column, so only matrices with leftmost column $e_1$ can be products of such matrices.

So we have:

Proposition 13.1. Under either definition of "small-stencil," any n×n matrix A in G can be factored into small-stencil elementary matrices so that the corresponding integer approximation preserves constant signals in band 1. Furthermore, any matrix in G can be factored into small-stencil elementary matrices in G under the flexible definition of "small-stencil," but (if n≧3) not under the strict definition.

The results in this section and the preceding one seem to indicate that requiring factors to be small-stencil substantially increases the size of the factorization. However, this is normally true only when one is factoring unusual matrices with long-scale but no short-scale interactions. For more typical matrices consisting of Laurent polynomials with no gaps in their coefficients, it is common to obtain the small-stencil property with no additional effort during the factorization process, or with only a small amount of care when one has a choice to make. An example of obtaining the small-stencil property with no added effort is shown in the upcoming section entitled "Example: The 9-7 Wavelet."

Causality and Small-Stencil Factorizations

We noted earlier that the the algorithms in the sections entitled "Factoring A z-Transform Matrix" and "Factors Which Preserve Constant Signals" need only slight modification so that, when applied to a causal matrix (one where no negative powers of z occur), they yield causal factor matrices. However, the algorithms in the sections entitled "Small-Stencil Factorizations" and "Simultaneous Small-Stencil And Constant-Preserving Factors" involve moving bands back and forth, thus introducing non-causal factors even when the original matrix is causal. If one wants a factorization into small-stencil elementary matrices which are also causal, then one will need modified methods, at least.

For an elementary matrix to be both causal and small-stencil, its nonzero off-diagonal entry must be of the form rz+s. If the flexible definition of "small-stencil" is used, then the z-coefficient r is allowed to be nonzero only for entries above the diagonal. The strict definition of small-stencil imposes stronger restrictions: the off-diagonal entry must be a constant adjacent to the diagonal or a monomial rz in the upper right corner (in the 2×2 case, a binomial rz+s is allowed in the upper right corner).

It turns out that, in the 2×2 case, causal small-stencil factorizations cannot always be attained:

Proposition 14.1. There exists a 2×2 matrix over R[z] of determinant 1 which cannot be expressed as a product of causal small-stencil elementary matrices.

Proof. Suppose a given non-constant 2×2 matrix A can be written as a product of causal small-stencil elementary matrices. A factor with an entry rz+s can be split up into a factor with entry rz and a factor with entry s. So A can be written as a product of constant matrices of determinant 1 and elementary matrices with upper right entry of the form rz. Express A as such a product with a minimal number of factors. (In this product, the two factor types must alternate, because two adjacent factors of the same type could be combined into one. Note that at least one rz factor must occur.)

The last factor in this product has at least one nonzero entry in its bottom row; select a column (column 1 or column 2) whose bottom entry in that last factor is nonzero. (If the last factor is an rz factor, column 2 will be selected.) Now multiply out this product of matrices from right to left. We will show by induction that, at each stage of this process (starting after the first rz matrix has been multiplied in), the two entries in the selected column of the partial product will have degrees differing by at most 1; in fact, if the last matrix multiplied in was an rz matrix, then the upper entry in the selected column will have degree 1 more than the degree of the lower entry.

The partial product just before the first rz matrix is multiplied in is constant, and its selected column has non-zero lower entry. Hence, after the rz matrix is multiplied in, the upper entry in the selected column will have degree 1 and the lower entry will have degree 0.

Suppose that (after multiplying by an rz matrix) the selected column in the current product has upper entry of degree d and lower entry of degree d−1. Then, after multiplying by a constant matrix of nonzero determinant, one of the two entries will have degree d and the other will have degree d−1 or d. The only way in which the lower entry will still have degree d−1 is if the lower left entry of the constant matrix is 0.

Now suppose we have just multiplied in a constant matrix of determinant 1, and are about to multiply in an rz matrix (not the first), and the selected column has entries of degrees differing by at most 1. Say the larger of the two degrees is d. The constant matrix just multiplied in cannot have lower left entry 0, because if it did we would have three consecutive factors of the form $$\begin{pmatrix} 1 & rz \\ 0 & 1 \end{pmatrix}\begin{pmatrix} \alpha & s \\ 0 & \alpha^{-1} \end{pmatrix}\begin{pmatrix} 1 & r'z \\ 0 & 1 \end{pmatrix},$$

and these could be replaced by the two factors $$\begin{pmatrix} 1 & (r+r'\alpha^2)z \\ 0 & 1 \end{pmatrix}\begin{pmatrix} \alpha & s \\ 0 & \alpha^{-1} \end{pmatrix},$$

contradicting the minimality of the factorization. So the lower entry of the selected column currently has degree d, while the upper entry has degree d−1 or d. After multiplying by the new rz matrix, the degree of the upper entry of the selected column will be d+1 and the degree of the lower entry will be d. This completes the induction.

In particular, the selected column of the final product A will have entries with degrees differing by at most 1. Now, the matrix $$\begin{pmatrix} 1 & z^2 \\ 0 & 1 \end{pmatrix}$$

is a 2×2 matrix of determinant 1 which has no column whose entries have degrees differing by at most 1. Therefore, this matrix cannot be the matrix A above; in other words, this matrix cannot be factored into causal small-stencil elementary factors.

On the other hand, the presence of a third band yields enough extra freedom to allow causal small-stencil factorizations:

Proposition 14.2. If n>2, then every n×n matrix over R[z] of determinant 1 can be expressed as a product of causal small-stencil elementary matrices.

(This is true even under the strictest definition of "small-stencil.")

Proof. We already know that such a matrix can be written as a product of causal elementary matrices. By (12.1), these elementary matrices can be factored into monomial elementary matrices, where the nonzero off-diagonal entry has the form $cz^k$ for some non-negative integer k. So it suffices to show that such a monomial elementary matrix can be written as a product of causal small-stencil elementary matrices.

If k=0, then we can do this using nearest-neighbor 'swaps' and one nearest-neighbor elementary matrix as in the section entitled "Small-Stencil Factorizations" the resulting factors are all constant and hence causal. For k=1, note that the elementary matrix with upper right entry cz (i.e., adding cz times band n to band 1) is causal and small-stencil; by combining this with constant nearest-neighbor 'swaps' (moving the source band to band n and the destination band to band 1, without wrapping around), we can handle an elementary matrix which adds cz times band i to band j.

Once we know how to add $cz^k$ times band i to band j for any i and j, we can add $cz^{k+1}$ times band i to band j for any i and j as follows: pick a band j' different from i and j, and do:

add z times band i to band j';
add $cz^k$ times band j' to band j;
add −z times band i to band j';
add $−cz^k$ times band j' to band j.

Therefore, by induction, we can handle any monomial elementary matrix.

What if we want a causal small-stencil factorization which also preserves a one-band constant signal? Let us first assume we are using the flexible version of "small-stencil." The strong version of constant preservation where the constant signal must be held in band 1 only (i.e., matrices in the group G) cannot be achieved here, because all causal small-stencil elementary matrices in G have first column $e_1$, so any product of such matrices also has first column $e_1$.

However, if we put the constant signal in band n instead, then a factorization which is causal, small-stencil, and strongly constant-preserving can be attained. (It follows that, if the constant band is allowed to "roam," then the factorization can be achieved no matter which band initially contains the constant signal.) To see this, note that, using permissible factors, we can add $c(z-1)$ times band i to band j if j<i, we can add c times band i to band j if i<n, and we can 'swap' bands i and j if i,j<n. Next, we can add $c(z-1)$ times band i to band j if i<j: if j<n, 'swap' bands i and j, add $-c(z-1)$ times band j to band i, and 'swap' bands j and i; if j=n, find j' different from i and j, add $c(z-1)$ times band i to band j', add band j' to band n, subtract $c(z-1)$ times band i from band j', and subtract band j' from band n. Hence, using the recursive method from Proposition 14.2, we can add $c(z-1)^k$ times band i to band j for any distinct i and j, where k is any nonnegative integer if i<n and k is any positive integer if i=n.

Now, given a causal matrix which preserves a constant in band n, we can factor it into causal elementary matrices preserving a constant in band n by the methods of described in the section entitled "Factors Which Preserve Constant Signals." Such an elementary matrix adds $p(z)$ times band i to band j, where the polynomial $p(z)$ must be divisible by z–1 if i=n. To factor this matrix further, just expand $p(z)$ in powers of z–1; each term in this expansion can be handled by the above, so, by (12.1), the whole elementary matrix can be factored into permissible factors.

For the strict version of "small-stencil," we already know by the argument from the section entitled "Simultaneous Small-Stencil And Constant-Preserving Factors" that strong constant preservation cannot be achieved (this argument works no matter which band contains the constant). However, if we allow the constant to roam, then a causal small-stencil factorization is possible. For this, it suffices by the above to be able to add $c(z-1)$ times the constant band to another band; this can be done by a version of the twelve-step method from the section entitled "Simultaneous Small-Stencil And Constant-Preserving Factors." Specifically, this method does not "wrap around"; instead, it handles the z part by moving the constant band to band n and the intermediate destination band "j'" to band 1.

EXAMPLE

The 9-7 Wavelet

As an example of the methods presented here, we consider a 9-7 wavelet which has been found to be well-suited for image compression and is in common use.

The exact formulas for the filter coefficients for this wavelet are given in the FBI fingerprint compression standard. The coefficients are expressed in terms of $x_1$, where $$x_1 = \left(\frac{-14\sqrt{15}+63}{1080\sqrt{15}}\right)^{1/3} + \left(\frac{-14\sqrt{15}-63}{1080\sqrt{15}}\right)^{1/3} - \frac{1}{6}$$

is the real root of the equation $$20x_1^3 + 10x_1^2 + 4x_1 + 1 = 0$$

The referenced formulas also use a complex number $x_2$, but they can be expressed in terms of $x_1$ using the formulas $$|x_2|^2 = x_1^2 + x_1/2 + 1/5 \text{ and}$$

$$Rx_2 = -x_1/2 - 1/4,$$

so $x_2$ is not needed. The filter coefficents then become:

$$h_0(0) = -\sqrt{2}\, x_1(240x_1^2 + 160x_1 + 83)/32$$
$$\approx 0.8526986790094034$$

$$h_0(\pm 1) = -\sqrt{2}\, x_1(160x_1^2 + 90x_1 + 37)/32$$
$$\approx 0.3774028556126538$$

$$h_0(\pm 2) = -\sqrt{2}\, x_1(10x_1^2 - 3)/8$$
$$\approx -0.1106244044184234$$

$$h_0(\pm 3) = 5\sqrt{2}\, x_1(2x_1 + 1)/32$$
$$\approx -0.0238494650193800$$

$$h_0(\pm 4) = -5\sqrt{2}\, x_1/64$$
$$\approx 0.0378284555069955$$

$$h_1(-1) = \sqrt{2}\,(6x_1 - 1)/(16x_1)$$
$$\approx 0.7884856164056644$$

$$h_1(-2) = h_1(0) = -\sqrt{2}\,(16x_1 - 1)/(64x_1)$$
$$\approx -0.4180922432222122$$

$$h_1(-3) = h_1(1) = -\sqrt{2}\,(2x_1 + 1)/(32x_1)$$
$$\approx -0.0406894176095584$$

$$h_1(-4) = h_1(2) = -\sqrt{2}\,/(64x_1)$$
$$\approx 0.0645388826289384$$

The z matrix specified by these filter coefficients is $$M(z) = \begin{pmatrix} a_{11}(z) & a_{12}(z) \\ a_{21}(z) & a_{22}(z) \end{pmatrix},$$

where $$a_{11}(z) = h_0(-4)z^{-2} + h_0(-2)z^{-1} + h_0(0) + h_0(2)z + h_0(4)z^2$$

$$a_{12}(z) = h_0(-3)z^{-1} + h_0(-1) + h_0(1)z + h_0(3)z^2$$

$$a_{21}(z) = h_1(-4)z^{-2} + h_1(-2)z^{-1} + h_1(0) + h_1(2)z$$

$$a_{22}(z) = h_1(-3)z^{-1} + h_1(-1) + h_1(1)z$$

It is already known to those of ordinary skill in the art how to factor M(z) into four elementary matrices and a constant diagonal matrix. In fact, these factors have the same symmetry as the matrix itself. The factors are also small-stencil; however, the integer approximation (of course, one has to factor the constant diagonal matrix further to get the integer approximation) does not preserve the constant signal. This is inevitable using symmetric factors, because requiring symmetry makes the factorization essentially unique. We will see that the use of asymmetric factors gives the extra freedom necessary for constant preservation while still using small-stencil factors. Since the given matrix is not causal, we do not need to look for causal factors.

The determinant of M(z) is 1. However, M(z) does not send a constant signal with value k to a constant value k on band 1 (the low-pass filter) and zero on band 2 (the high-pass filter); it sends this constant signal to a constant $\sqrt{2}k$ on band 1 and zero on band 2. We therefore pull out a constant diagonal scaling matrix factor $$S = \begin{pmatrix} \sqrt{2} & 0 \\ 0 & 1/\sqrt{2} \end{pmatrix}$$

and work with the matrix $S^{-1}M(z)$ from now on; for applications such as compression this scaling factor makes little difference anyway and is less important than constant preservation.

Next, as specified earlier, we pull out a factor $$\Delta = \begin{pmatrix} 1 & 0 \\ -1 & 1 \end{pmatrix}$$

from the right, leaving a matrix $A(z) = S^{-1}M(z)\Delta^{-1}$ satisfying $A(1)e_1 = e_1$. We will now work out a small-stencil constant-preserving factorization for A(z) (more efficient than the one described earlier in the section entitled Simultaneous Small-Stencil and Constant-Preserving Factors).

We start eliminating in the first column. First we do a row operation to eliminate the $z^2$-term from $a_{11}$. (Note that this must also eliminate the $z^2$-term from $a_{12}$, because otherwise the determinant of the new matrix would have a $z^3$-term.) We have an extra degree of freedom here, so we can eliminate the $z^{-2}$-term from $a_{11}$ (and the $z^{-1}$-term from $a_{12}$) at the same time; this is what the usual symmetric factorization process does. Next, we do a row operation to eliminate the $z^{-2}$-term from $a_{21}$; here there is no extra degree of freedom, and we have to break symmetry to maintain constant preservation. The third step eliminates one term from $a_{11}$, and this must be the trailing term (the $z^{-1}$-term ) in order to make later factors small-stencil. The fourth operation eliminates the z-term from $a_{21}$, and the fifth operation eliminates the z-term from $a_{11}$. The remaining $a_{11}$ is a constant, and since the matrix is in the group G, the constant must be 1. In fact, we find that the remaining matrix is elementary (unit lower triangular) and small-stencil. This remaining factor can be combined with the factor $\Delta$, which is also unit lower triangular. This yields the factorization:

$$S^{-1}M(z) = U_1(z)L_2(z)U_3(z)L_4(z)U_5(z)L_6(z)$$

where $U_i(z)$ is small-stencil unit upper triangular and $L_i(z)$ is small-stencil lower triangular:

$$U_i(z) = \begin{pmatrix} 1 & r_i z + s_i \\ 0 & 1 \end{pmatrix}, \quad L_i(z) = \begin{pmatrix} 1 & 0 \\ r_i z^{-1} + s_i & 1 \end{pmatrix}.$$

The coefficients in these factor matrices are:

| | |
|---|---|
| $r_1 = 5x_1^2/2$ | $s_1 = r_1$ |
| $r_2 = (20x_1^2 + 3)/4$ | $s_2 = r_2$ |
| $r_3 = 0$ | |
| $s_3 = (-410x_1^2 - 90x_1 + 13)/110$ | |
| $r_4 = -(40x_1^2 + 5)/4$ | $s_4 = -r_4$ |
| $r_5 = (-70x_1^2 + 45x_1 + 21)/55$ | $s_5 = 0$ |
| $r_6 = 5x_1^2$ | $s_6 = r_6 - 1$ |

The numerical values of these coefficients are:

| | |
|---|---|
| $r_1 \approx 0.2930671710299618$ | $s_1 \approx 0.2930671710299618$ |
| $r_2 \approx 1.3361343420599236$ | $s_2 \approx -1.3361343420599236$ |
| $r_3 \approx 0$ | $s_3 \approx -0.0386222501060046$ |
| $r_4 \approx 2.4222686841198471$ | $s_4 \approx 2.4222686841198471$ |
| $r_5 \approx -0.0475120919539189$ | $s_5 \approx 0$ |
| $r_6 \approx 0.5861343420599236$ | $s_6 \approx -1.5861343420599236$ |

Note that, for each $i \leq 6$, there is a simple relation between $r_i$ and $s_i$ (or one of them is 0). This means that, in each case, the rounded value $<r_i a + s_i b>$ for integer arguments a and b can be computed by integer additions or subtractions together with a single operation of the form $c \mapsto <rc>$, where c is an integer and r is $r_i$ or $s_i$. If the latter operation can be performed by lookup in a precomputed table, then floating-point arithmetic can be avoided altogether.

Since this factorization is not symmetric, it has a mirror-image form which can be obtained by reversing the signal, applying the factorization as above, and reversing again. To do this algebraically, we replace z with $z^{-1}$ and conjugate by $$\begin{pmatrix} 1 & 0 \\ 0 & z \end{pmatrix};$$

note that this leaves M(z) unchanged. The effect on the factors is to simply interchange $r_i$ with $s_i$ for each i.

We now perform some error analysis for this factorization, starting with the norm method.

Computing the norm of an arbitrary z-transform matrix appears to be a messy nonlinear optimization problem, but for an elementary matrix it is feasible. Let p(z) be the nonzero off-diagonal entry of a 2×2 elementary matrix B. Let b be the absolute value of the constant term of p(z), and let a be the sum of the absolute values of the coefficients of the nonconstant terms of p(z). Then $\|B\|$ is the maximum value of $$\sqrt{x^2+(y+bx+a)^2}$$

for real numbers x and y such that $x^2+y^2=1$.

In fact, the same formula works for the norm of an n×n elementary matrix with nonzero off-diagonal entry p(z). Here we need to maximize $$\sqrt{x^2+(y+bx+a)^2+x_3^2+x_4^2+\ldots+x_n^2}$$

subject to the constraint $x^2+y^2+x_3^2+\ldots+x_n^2=1$. This is equivalent to maximizing $x^2+(y+bx+a)^2+x_3^2+\ldots+x_n^2-(x^2+y^2+x_3^2+\ldots+x_n^2)=2y(bx+a)+(bx+a)^2$ under this same constraint. If we hold x fixed, then the new objective function is linear in y, so it is maximized at one of the two extreme values of y; these extreme values occur when $x_3=\ldots=x_n=0$. This reduces the problem to the 2×2 case.

Actually computing this maximum requires he solution of a quartic polynomial equation in general, so one will normally resort to numerical approximation. But there are some special cases where the answer is simpler:

if b=0, then $\|B\|=a+1$;

if $a = 0$, then $\|B\| = \dfrac{b+\sqrt{b^2+4}}{2}$;

if $a = b$, then $\|B\| = \sqrt{\dfrac{2(a^4+5a^2+2+a\sqrt{a^2+3})}{a^2+4}}$

For the matrices $U_i(z)$ and $L_i(z)$, we have $a=|r_i|$ and $b=|s_i|$. Five of these six matrices fall under the special cases above; we handle the remaining matrix $L_6(z)$ by numerical methods. The resulting matrix norms are:

$\|U_1(z)\| \approx 1.4037242452456795$ $\|L_2(z)\| \approx 3.1167781378219282$ $\|U_3(z)\| \approx 1.0194975674480953$ $\|L_4(z)\| \approx 5.1277219075789451$ $\|U_5(z)\| \approx 1.0475120919539189$ $\|L_6(z)\| \approx 2.6101749209829466$ Now we can use (2.1) to compute error bounds: for the forward transform the error bound is about 29.0346469116757969; for the inverse transform (which can also be computed using norms because we are in the 2×2 case) we get a bound of 39.6038983737180800.

These bounds can probably be improved by direct error analysis in the manner discussed earlier, but this would require analyzing a combination of 17 separate errors (which are probably not independent). Instead we go to empirical methods. A random sample of over 4.6×10⁹ test cases (using random integers chosen uniformly from the interval $[-2^{16}, 2^{16}-1]$) yielded the following worst errors:

Forward transform: error≈4.1636582346765949 for input $$\binom{-2522}{-16164}, \binom{-6636}{658}, \binom{-3046}{-14296}, \binom{6398}{10921}, \binom{-6254}{8138}$$

Inverse transform: error≈4.0303761353834788 for input $$\binom{757}{10905}, \binom{-15135}{11419}, \binom{-11480}{511}, \binom{6895}{-1806}, \binom{-10013}{11732}$$

(One needs five successive input pairs of low-band, high-band entries to compute one output pair.)

One might expect the alternate mirror-image form of the factorization to have the same error bounds. However, the reflection also changes the pairing between the band-1 entries and the band-2 entries. (When the input signal is split into length-2 vectors, each band-1 entry is paired with the entry that immediately follows it in band 2. After the reflection, these two entries will end up in separate vectors.) So there is no reason to expect the error bounds to be identical. In fact, testing yields inputs with errors slightly worse than those found for the unreflected factorization:

Forward transform: error≈4.2264010122204445 for input $$\binom{12962}{12976}, \binom{-15095}{-13917}, \binom{-4271}{-3962}, \binom{12318}{6625}, \binom{-13212}{-5853}$$

Inverse transform: error≈4.1588504091004767 for input $$\binom{-4703}{-8068}, \binom{-12506}{-7893}, \binom{13822}{-6129}, \binom{3251}{-14093}, \binom{-14943}{-5253}$$

Of course, there are many possible factorizations other than these two; finding an optimal one appears to be quite a challenge.

Using IIR Polynomial Division

As we have noted before, a factorization of a z-transform matrix into elementary factors may be much longer than a factorization of a constant matrix; in fact, there is no fixed bound on the length of the z-transform factorization. The main reason for this is that the entries in the elementary matrices are quotients. We can divide by an arbitrary nonzero number, but we cannot divide by an arbitrary nonzero polynomial because only Laurent polynomials are allowed as entries in factor matrices. We will now look at what happens if we relax this restriction.

If $$A = \begin{pmatrix} a_{11} & a_{12} \\ a_{21} & a_{22} \end{pmatrix}$$

has determinant 1 and we can divide by $a_{21}$, then we can factor A into three elementary matrices as described in the section entitled "Preserving Particular Lattice Points:

$$A = \begin{pmatrix} 1 & \dfrac{a_{11}-1}{a_{21}} \\ 0 & 1 \end{pmatrix} \begin{pmatrix} 1 & 0 \\ a_{21} & 1 \end{pmatrix} \begin{pmatrix} 1 & \dfrac{a_{22}-1}{a_{21}} \\ 0 & 1 \end{pmatrix}.$$

So when can we divide by $a_{21}$? Clearly we can if $a_{21}$ is a nonzero constant or monomial. In other cases the process will be IIR (infinite impulse response) rather than FIR (finite impulse response).

For instance, suppose $a_{21}(z)=1-cz$. Then $$\frac{1}{a_{21}} = 1 + cz + c^2 z^2 + \ldots,$$

so adding, say, $$\frac{1}{a_{21}}$$

times the second band to the first band would involve combining entries from arbitrarily far in the past from the second band to update the current entry in the first band.

This also raises the issue of numerical stability. If $|c|>1$, then we are adding larger and larger multiples of older entries from the second band to the first band, and the process is quite unstable and leads to an unbounded result. If $|c|<1$, though, then the process is stable and the result of applying it to a bounded signal is still a bounded signal.

If $p(z)$ is a nonzero Laurent polynomial whose zeros (other than 0) all have absolute value greater than 1, then p can be written as a product of a monomial and some number of factors of the form $1-cz$ with $|c|<1$. Since we can divide by each of these factors stably in turn, we can divide by p stably.

In fact, the process of dividing by p is just the standard long-division algorithm for (Laurent) polynonials, starting at the low-degree end. There is no need to factor p into linear factors and divide by them separately; the result is the same if one just performs the long division by p directly. This also means that one does not have to remember the entire past signal during the long division process; one only has to remember the current partial remainder, which is no longer than p.

Let us now return to the polynomial $1-cz$, and assume this time that $|c|<1$, so we cannot simply perform the division as above. What we can do instead is rewrite $1-cz$ as $-cz(1-c^{-1}z^{-1})$. The monomial $-cz$ causes no difficulty, and, since $|c|<1$, the expression $$\frac{1}{(1 - c^{-1}z^{-1})} = 1 + c^{-1}z^{-1} + c^{-2}z^{-2} + \ldots$$

has decreasing coefficients and leads to a stable division algorithm.

This corresponds to simply doing the long division in the opposite direction, starting from the high end (which is what one commonly does with polynomial division anyway). Again one can handle multiple factors of this form with a single long division. Of course, we are giving up on causality here.

In general, suppose $a_{21}$ is a Laurent polynomial which does not have any (complex) zeros of absolute value 1. Then we can factor $a_{21}$ into two parts, one having the zeros of absolute value greater than 1 and the other having the zeros of absolute value less than 1. This lets us express $a_{21}$ in the form $m(z)p(z)q(z^{-1})$, where $m(z)$ is a monomial and p and q are polynomials (ordinary, not Laurent) with constant term 1 whose zeros are all of absolute value greater than 1. Dividing by $m(z)$ is easy; we divide by $p(z)$ and $q(z^{-1})$ successively using IIR long division, with the first division proceeding from low to high degree and the second division proceeding from high to low degree.

There are some special cases of interest. If $a_{21}$ is a symmetric Laurent polynomial (i.e., $a_{21}(z)=a_{21}(z^{-1})$) which has no zeros of absolute value 1, then the polynomials p and q are actually equal; we can absorb the monomial into the other factors and write $a_{21}$ in the form $p(z)p(z^{-1})$ for some polynomial p (although this will require complex coefficients if $a_{21}(1)<0$). Another common situation is for the the Laurent polynomial $a_{21}(z)$ to have one dominant coefficient whose absolute value is greater than the sum of the absolute values of all of the other coefficients. In this case, it is impossible for $a_{21}$ to have a complex zero of absolute value 1, so we definitely can factor $a_{21}$ as above for division purposes.

Finally, what if $a_{21}$ has a complex zero of absolute value 1? The simplest case is $a_{21}=z-1$. If a constant signal x is multiplied by $a_{21}$, the result will be zero no matter what the constant is. Hence, given $a_{21}x$, one cannot recover x; in other words, division by $a_{21}$ is not even well-defined. The same thing happens for any polynomial $a_{21}$ with a zero w such that $|w|=1$: there is a nonzero bounded signal $x=(\ldots w^2, w, 1, w^{-1}, w^{-2}, \ldots)$ such that $a_{21}x$ is zero, so it is impossible to divide by $a_{21}$. (If $a_{21}$ has real coefficients but w is not real, then one can take the real part of the signal x above to get a real nonzero signal annihilated by $a_{21}$.)

We have shown here that, in many cases, it is possible to use IIR integer-approximable factors for a FIR linear transformation, and that this may require fewer factors than a FIR factorization (thus possibly giving faster computation and lower error bounds). The main drawback of this method is that it requires processing the entire signal even if one only needs part of the output (say, a subinterval of the transformed signal). The need for this is frequent enough that it is usually worthwhile to use FIR factors even when more of them are required.

Conclusion

We have shown that a z-transform matrix (for a perfect reconstruction FIR signal transformation) of determinant 1 can be factored into elementary matrices (liftings) in a variety of ways; this allows us to find integer approximations to these factors (and hence to the original transformation) with additional useful properties, such as locality of interaction, causality, and/or preservation of constant integer signals.

Just as in the fixed-length case, there are a number of possibilities here that remain to be explored, including additional factorizations of matrices and improved error analysis. Also, additional study would be helpful for the case of more than two bands (as mentioned earlier, one can use unit triangular matrices instead of elementary matrices and thus reduce the number of factors; algorithms for producing efficient factorizations into such factors would be quite useful) and for multidimensional signals (where one cannot always factor a transformation into elementary matrices, and even when one can, such as when there are more than two bands, the number of such matrices may be excessive).

The embodiments of the invention in which an exclusive property or privilege is claimed are defined as follows:

1. A method for generating a first plurality of output data values by transforming a plurality of input data values using a computer, the first plurality of output data values approximating a second plurality of output data values, the second plurality of output data values generated by applying a linear transform to the plurality of input data values, the method comprising the step of:

modifying at least one data value in the plurality of current input data values, each modified data value generated by applying a linear combination of unmodified values in the plurality of input data values to the at least one data value, the linear combination comprised of an integer generated in a reproducible manner, the integer being from one of a group consisting of a rounded integer and a converted integer;

wherein the linear transform is a fixed finite-dimensional linear transform, and wherein the step of modifying the at least one data value in the plurality of current input data values comprises:

successively sweeping through a plurality of bands of input data values in a first direction:

successively adding to each band during each successive sweep in the first direction the linear combination of unmodified values in the plurality of input data values, the linear combination being a rounded linear combination of the plurality of input data values in preceding bands;

successively sweeping through a plurality of bands in a second direction, the second direction being different than the first direction;

successively adding to each band during each successive sweep in the second direction the linear combination of unmodified values in the plurality of input data values, the linear combination being a rounded linear combination of the plurality of input data values in preceding bands; and adding to one of the bands the linear combination of unmodified values in the plurality of input data values, the linear combination being a rounded linear combination of the plurality of input data values in all remaining bands.

2. The method of claim 1 wherein the step of rearranging at least one of the plurality of input data values comprises permuting a plurality of bands, the plurality of bands including the plurality of input data values, and wherein the step of modifying the at least one of the plurality of input data values further includes permuting the plurality of bands after adding to one of the bands.

3. The method of claim 1 wherein the linear transform is a wavelet transform.

4. The method of claim 3 wherein the linear transform has a property that when applied to the plurality of input data values, the plurality of input data values being zero except at one location, the second plurality of output data values generated by applying the linear transform are identical to the plurality of input data values, and the method having the same property.

5. The method of claim 3 wherein the plurality of input data values includes an input integer plurality and the second plurality of output data values includes an output integer plurality, the linear transform mapping an integer multiple of the input integer plurality to an integer multiple of the integer output plurality, the integer multiple of the input integer plurality corresponding to the integer multiple of the integer output plurality, and the method mapping the integer multiple of the integer input plurality to the corresponding integer multiple of the integer output plurality.

6. The method of claim 3 wherein the step of rearranging the at least one data value is performed on only adjacent data values in the plurality of input data values.

7. The method of claim 3 wherein the step of modifying the at least one data value is performed using only adjacent data values in the plurality of input data values to modify the at least one data value.

8. The method of claim 3 wherein the wavelet transform is a 9-7 wavelet transform.

9. A method for generating a first plurality of output data values by transforming a plurality of input data values using a computer, the first plurality of output data values approximating a second plurality of output data values, the second plurality of output data values generated by applying a linear transform to the plurality of input data values, the linear transform comprising a 2×2 diagonal matrix D of determinant 1, the method comprising at least one step of the following types:

rearranging at least one data value in a plurality of current input data values;

negating at least one data value in the plurality of current input data values;

modifying at least one data value in the plurality of current input data values, each modified data value generated by applying a linear combination of unmodified values in the plurality of input data values to the at least one data value, the linear combination comprised of an integer generated in a reproducible manner, and a step that is equivalent to a successive combination of one or more of the preceding three types;

wherein an error difference between the first plurality of output data values and the second plurality of output data values is bounded, the method further comprising factoring D into four elementary matrices $$D = \begin{pmatrix} 1 & r \\ 0 & 1 \end{pmatrix} \begin{pmatrix} 1 & 0 \\ s & 1 \end{pmatrix} \begin{pmatrix} 1 & -r\alpha^{-1} \\ 0 & 1 \end{pmatrix} \begin{pmatrix} 1 & 0 \\ -s\alpha & 1 \end{pmatrix},$$

where $rs+1=\alpha$; or $$D = \begin{pmatrix} 1 & 0 \\ s & 1 \end{pmatrix} \begin{pmatrix} 1 & r \\ 0 & 1 \end{pmatrix} \begin{pmatrix} 1 & 0 \\ -s\alpha & 1 \end{pmatrix} \begin{pmatrix} 1 & -r\alpha^{-1} \\ 0 & 1 \end{pmatrix},$$

where $rs+1=\alpha^{-1}$; or factoring D into three elementary matrices and a permutation matrix $$D = \begin{pmatrix} 0 & 1 \\ -1 & 0 \end{pmatrix} \begin{pmatrix} 1 & 0 \\ \alpha & 1 \end{pmatrix} \begin{pmatrix} 1 & -\alpha^{-1} \\ 0 & 1 \end{pmatrix} \begin{pmatrix} 1 & 0 \\ \alpha & 1 \end{pmatrix}; \text{ or}$$

$$D = \begin{pmatrix} 0 & -1 \\ 1 & 0 \end{pmatrix} \begin{pmatrix} 1 & \alpha^{-1} \\ 0 & 1 \end{pmatrix} \begin{pmatrix} 1 & 0 \\ -\alpha & 1 \end{pmatrix} \begin{pmatrix} 1 & \alpha^{-1} \\ 0 & 1 \end{pmatrix}; \text{ and}$$

selecting a value for $\alpha$ and, if necessary, determining a value for r, to minimize the bound of the error difference for at least one of the preceding factorizations.

10. The method of claim 9 wherein the first plurality of output data values are integers if the plurality of input data values are integers.

11. The method of claim 10 wherein the plurality of input data values can be reconstructed exactly from the first plurality of output data values.

12. The method of claim 9 wherein the linear transform has a determinant, the determinant being invertible as one of a group consisting of an integer and an integer Laurent polynomial.

13. The method of claim 9 wherein the linear transform has a determinant, the determinant being invertible as one of a group consisting of a real number and a real Laurent polynomial, and the method further comprising rescaling at least one of a plurality of bands in the linear transform.

14. The method of claim 9 wherein the linear transform has a property that when applied to the plurality of input data values, the plurality of input data values being zero except at one location, the second plurality of output data values generated by applying the linear transform are identical to the plurality of input data values.

15. The method of claim 9 wherein the plurality of input data values includes an input integer plurality and the second plurality of output data values includes an output integer plurality, the linear transform mapping an integer multiple of the input integer plurality to an integer multiple of the integer output plurality, the integer multiple of the input integer plurality corresponding to the integer multiple of the integer output plurality, and the method mapping the integer multiple of the integer input plurality to the corresponding integer multiple of the integer output plurality.

16. The method of claim 9 wherein the linear transform is one of a plurality of RGB-to-YCbCr color transforms.

17. The method of claim 9 wherein the linear transform is a RGB-to-YIQ color transform.

18. The method of claim 9, further comprising preserving a selected property in which $A(k1)=ke_1$ where A is a matrix providing the linear transform, k is a constant, 1 is a vector with all entries equal to 1, and $e_1$ is an elementary vector with a first entry of 1 and remaining entries of 0.

* * * * *